US012619316B1

(12) United States Patent
Rodrigues et al.

(10) Patent No.: US 12,619,316 B1
(45) Date of Patent: May 5, 2026

(54) ULTRA LOW FRICTION GESTURAL INTERFACE FOR ARTIFICIAL REALITY

(71) Applicant: Meta Platforms Technologies, LLC, Menlo Park, CA (US)

(72) Inventors: Annika Rodrigues, Lynnwood, WA (US); Jenna Velez, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 200 days.

(21) Appl. No.: 18/068,539

(22) Filed: Dec. 20, 2022

Related U.S. Application Data

(60) Provisional application No. 63/328,982, filed on Apr. 8, 2022.

(51) Int. Cl.
G06F 3/01 (2006.01)
G06T 19/00 (2011.01)
(Continued)

(52) U.S. Cl.
CPC .............. G06F 3/017 (2013.01); G06F 3/013 (2013.01); G06T 19/003 (2013.01); H04L 51/04 (2013.01);
(Continued)

(58) Field of Classification Search
USPC .......................................................... 715/863
See application file for complete search history.

(56) References Cited

U.S. PATENT DOCUMENTS

| | | |
|---|---|---|
| 5,107,443 A | 4/1992 | Smith et al. |
| 5,600,765 A | 2/1997 | Ando et al. |

(Continued)

FOREIGN PATENT DOCUMENTS

| | | |
|---|---|---|
| CN | 102084354 A | 6/2011 |
| CN | 102695032 A | 9/2012 |

(Continued)

OTHER PUBLICATIONS

Argelaguet F., et al., "A Survey of 3D Object Selection Techniques for Virtual Environments," Computers & Graphics,2013, vol. 37, No. 3, pp. 121-136.

(Continued)

*Primary Examiner* — William L Bashore
*Assistant Examiner* — Koorosh Nehchiri
(74) *Attorney, Agent, or Firm* — Morgan, Lewis & Bockius LLP

(57) ABSTRACT

Aspects of the present disclosure are directed to gesture-based user interfaces (UIs) for artificial reality (XR) messaging applications. By supplementing or replacing "gaze to tap" user interfaces with "ultra low friction" (ULF) gestures, a user is not required to repeatedly remove his focus from the real world to gaze at menu options in order to select them. The ULF gestures can include, for example, a single pinch motion to tell a messaging application to start recording a voice message. Releasing the pinch stops the recording and allows for editing, while a snap (or tug right) can stop the recording and send the message immediately. A tug left can delete the message unsent. Adding these ULF gestures to the messaging application's UI allows the user to fully engage with the application while maintaining visual focus on the real world, thus encouraging the user to remain connected through the XR system.

20 Claims, 10 Drawing Sheets

(51) Int. Cl.
    *H04L 51/04*      (2022.01)
    *H04M 1/72433*   (2021.01)
(52) U.S. Cl.
    CPC ... *H04M 1/72433* (2021.01); *G06T 2219/024*
                                (2013.01)

(56) References Cited

U.S. PATENT DOCUMENTS

| | | | |
|---|---|---|---|
| 6,563,498 B1 | 5/2003 | Hirata et al. | |
| 6,784,901 B1 | 8/2004 | Harvey et al. | |
| 6,842,175 B1 | 1/2005 | Schmalstieg et al. | |
| 7,119,819 B1 | 10/2006 | Robertson et al. | |
| 7,231,609 B2 | 6/2007 | Baudisch | |
| 7,701,439 B2 | 4/2010 | Hillis et al. | |
| 7,971,157 B2 | 6/2011 | Markovic et al. | |
| 8,402,391 B1 | 3/2013 | Doray et al. | |
| 8,558,759 B1 | 10/2013 | Prada Gomez et al. | |
| 8,788,952 B2 | 7/2014 | Hamilton, II et al. | |
| 8,836,768 B1 | 9/2014 | Rafii et al. | |
| 8,884,876 B2 | 11/2014 | Song et al. | |
| 8,913,056 B2 | 12/2014 | Zimmer et al. | |
| 8,947,351 B1 | 2/2015 | Noble | |
| 9,117,274 B2 | 8/2015 | Liao et al. | |
| 9,285,589 B2 * | 3/2016 | Osterhout | G02B 27/017 |
| 9,292,089 B1 | 3/2016 | Sadek | |
| 9,323,422 B2 | 4/2016 | Song et al. | |
| 9,477,303 B2 | 10/2016 | Fleischmann et al. | |
| 9,477,368 B1 | 10/2016 | Filip et al. | |
| 9,552,673 B2 * | 1/2017 | Hilliges | G06F 3/011 |
| 9,659,413 B2 | 5/2017 | Grossinger et al. | |
| 9,749,367 B1 | 8/2017 | Kirby et al. | |
| 9,817,472 B2 | 11/2017 | Lee et al. | |
| 9,865,260 B1 | 1/2018 | Vuskovic et al. | |
| 9,983,687 B1 | 5/2018 | Forsblom et al. | |
| 9,992,451 B2 | 6/2018 | Ono et al. | |
| 10,019,843 B2 | 7/2018 | Grossinger et al. | |
| 10,042,430 B2 | 8/2018 | Bedikian et al. | |
| 10,168,789 B1 | 1/2019 | Soto et al. | |
| 10,220,303 B1 | 3/2019 | Schmidt et al. | |
| 10,248,284 B2 | 4/2019 | Tani et al. | |
| 10,248,301 B2 | 4/2019 | Stachniak et al. | |
| 10,261,595 B1 * | 4/2019 | Kin | G06F 3/04815 |
| 10,281,976 B2 | 5/2019 | Nishizawa et al. | |
| 10,353,532 B1 | 7/2019 | Holz et al. | |
| 10,402,081 B1 | 9/2019 | Andersen et al. | |
| 10,437,460 B2 | 10/2019 | Moore et al. | |
| 10,473,935 B1 | 11/2019 | Gribetz et al. | |
| 10,489,978 B2 | 11/2019 | Dimitrov et al. | |
| 10,503,349 B2 | 12/2019 | Alexander | |
| 10,521,944 B2 | 12/2019 | Sareen et al. | |
| 10,595,011 B2 | 3/2020 | Han et al. | |
| 10,691,205 B1 | 6/2020 | Schick | |
| 10,890,983 B2 * | 1/2021 | Ravasz | G06F 3/04847 |
| 10,930,075 B2 | 2/2021 | Costa et al. | |
| 10,936,080 B2 | 3/2021 | Marcolina et al. | |
| 10,937,215 B1 | 3/2021 | Iskandar | |
| 11,043,004 B2 | 6/2021 | Iyer et al. | |
| 11,054,895 B2 | 7/2021 | Ho et al. | |
| 11,086,406 B1 | 8/2021 | Ravasz et al. | |
| 11,113,891 B2 | 9/2021 | Noris et al. | |
| 11,150,730 B1 | 10/2021 | Anderson et al. | |
| 11,194,438 B2 | 12/2021 | Boesel et al. | |
| 11,216,152 B2 | 1/2022 | Alexander | |
| 11,221,730 B2 | 1/2022 | Murphy et al. | |
| 11,256,336 B2 | 2/2022 | Schoen | |
| 11,294,475 B1 | 4/2022 | Pinchon et al. | |
| 11,307,671 B2 | 4/2022 | Liu et al. | |
| 11,334,212 B2 | 5/2022 | Ravasz et al. | |
| 11,366,319 B1 | 6/2022 | Douglas et al. | |
| 11,514,650 B2 | 11/2022 | Kim et al. | |
| 11,556,183 B1 | 1/2023 | Li et al. | |
| 11,669,298 B2 * | 6/2023 | Huang | A63F 13/65 |
| | | | 715/722 |
| 11,726,578 B1 | 8/2023 | Gupta et al. | |
| 12,001,419 B1 | 6/2024 | Khoyilar et al. | |

| | | | |
|---|---|---|---|
| 2003/0224854 A1 | 12/2003 | Joao | |
| 2004/0150664 A1 | 8/2004 | Baudisch | |
| 2004/0261013 A1 | 12/2004 | Wynn et al. | |
| 2004/0266505 A1 | 12/2004 | Keam et al. | |
| 2005/0018216 A1 | 1/2005 | Barsness et al. | |
| 2006/0146765 A1 | 7/2006 | Van De Sluis et al. | |
| 2007/0250787 A1 | 10/2007 | Kawahara et al. | |
| 2008/0012865 A1 | 1/2008 | Forbes | |
| 2008/0059904 A1 | 3/2008 | Abbey et al. | |
| 2008/0089587 A1 | 4/2008 | Kim et al. | |
| 2008/0174550 A1 | 7/2008 | Laurila et al. | |
| 2009/0077504 A1 | 3/2009 | Bell et al. | |
| 2009/0254843 A1 | 10/2009 | Van Wie et al. | |
| 2009/0300639 A1 | 12/2009 | Hamilton, II et al. | |
| 2009/0319929 A1 | 12/2009 | Wang et al. | |
| 2010/0031203 A1 | 2/2010 | Morris et al. | |
| 2010/0103101 A1 | 4/2010 | Song et al. | |
| 2010/0103167 A1 | 4/2010 | Song et al. | |
| 2010/0103178 A1 | 4/2010 | Song et al. | |
| 2010/0125815 A1 | 5/2010 | Wang et al. | |
| 2010/0156892 A1 | 6/2010 | Chan, II et al. | |
| 2010/0306716 A1 | 12/2010 | Perez | |
| 2011/0022393 A1 | 1/2011 | Wäller et al. | |
| 2011/0164029 A1 | 7/2011 | King et al. | |
| 2011/0169927 A1 | 7/2011 | Mages et al. | |
| 2011/0228078 A1 | 9/2011 | Chen et al. | |
| 2011/0239155 A1 | 9/2011 | Christie | |
| 2011/0249024 A1 | 10/2011 | Arrasvuori et al. | |
| 2011/0267265 A1 | 11/2011 | Stinson | |
| 2011/0283231 A1 * | 11/2011 | Richstein | G06F 3/0488 |
| | | | 715/810 |
| 2012/0030624 A1 | 2/2012 | Migos | |
| 2012/0059720 A1 * | 3/2012 | Musabji | G01C 21/3647 |
| | | | 701/527 |
| 2012/0069168 A1 | 3/2012 | Huang et al. | |
| 2012/0071892 A1 | 3/2012 | Itkowitz et al. | |
| 2012/0089950 A1 * | 4/2012 | Tseng | G06F 3/04883 |
| | | | 715/854 |
| 2012/0096397 A1 | 4/2012 | Ording et al. | |
| 2012/0113223 A1 | 5/2012 | Hilliges et al. | |
| 2012/0131495 A1 | 5/2012 | Goossens et al. | |
| 2012/0143358 A1 | 6/2012 | Adams et al. | |
| 2012/0188279 A1 | 7/2012 | Demaine | |
| 2012/0206345 A1 | 8/2012 | Langridge | |
| 2012/0210254 A1 | 8/2012 | Fukuchi et al. | |
| 2012/0218183 A1 | 8/2012 | Givon et al. | |
| 2012/0218395 A1 | 8/2012 | Andersen et al. | |
| 2012/0249740 A1 | 10/2012 | Lee et al. | |
| 2012/0249741 A1 | 10/2012 | Maciocci et al. | |
| 2012/0275686 A1 | 11/2012 | Wilson et al. | |
| 2012/0290662 A1 * | 11/2012 | Weber | G06N 20/00 |
| | | | 715/835 |
| 2012/0293544 A1 | 11/2012 | Miyamoto et al. | |
| 2013/0057642 A1 | 3/2013 | Catchpole | |
| 2013/0063345 A1 | 3/2013 | Maeda | |
| 2013/0069985 A1 | 3/2013 | Wong et al. | |
| 2013/0093751 A1 | 4/2013 | Stachniak et al. | |
| 2013/0125066 A1 | 5/2013 | Klein et al. | |
| 2013/0147793 A1 | 6/2013 | Jeon et al. | |
| 2013/0174101 A1 | 7/2013 | Han et al. | |
| 2013/0182902 A1 | 7/2013 | Holz | |
| 2013/0208135 A1 | 8/2013 | Han et al. | |
| 2013/0265220 A1 | 10/2013 | Fleischmann et al. | |
| 2013/0278501 A1 | 10/2013 | Bulzacki | |
| 2013/0283213 A1 | 10/2013 | Guendelman et al. | |
| 2013/0339142 A1 | 12/2013 | Hewinson | |
| 2014/0007484 A1 | 1/2014 | Erdoss et al. | |
| 2014/0009407 A1 | 1/2014 | Kim | |
| 2014/0028567 A1 | 1/2014 | Park et al. | |
| 2014/0028716 A1 | 1/2014 | Yeh | |
| 2014/0040815 A1 | 2/2014 | Goossens et al. | |
| 2014/0062854 A1 | 3/2014 | Cho | |
| 2014/0104206 A1 | 4/2014 | Anderson | |
| 2014/0125598 A1 | 5/2014 | Cheng et al. | |
| 2014/0152623 A1 | 6/2014 | Lee et al. | |
| 2014/0189737 A1 | 7/2014 | Jang et al. | |
| 2014/0201145 A1 | 7/2014 | Dorman et al. | |
| 2014/0204002 A1 | 7/2014 | Bennet et al. | |
| 2014/0210797 A1 | 7/2014 | Kreek et al. | |

(56) References Cited

U.S. PATENT DOCUMENTS

| | | |
|---|---|---|
| 2014/0232637 A1 | 8/2014 | Park et al. |
| 2014/0236996 A1 | 8/2014 | Masuko et al. |
| 2014/0267078 A1 | 9/2014 | Kukulski et al. |
| 2014/0279242 A1 | 9/2014 | Staicut et al. |
| 2014/0282274 A1 | 9/2014 | Everitt et al. |
| 2014/0282275 A1 | 9/2014 | Everitt et al. |
| 2014/0306891 A1 | 10/2014 | Latta et al. |
| 2014/0320408 A1 | 10/2014 | Zagorsek et al. |
| 2014/0344922 A1 | 11/2014 | Lam et al. |
| 2014/0357366 A1 | 12/2014 | Koganezawa et al. |
| 2014/0361988 A1 | 12/2014 | Katz et al. |
| 2014/0375691 A1 | 12/2014 | Kasahara |
| 2015/0029120 A1 | 1/2015 | Sieckmann |
| 2015/0035746 A1 | 2/2015 | Cockburn et al. |
| 2015/0040040 A1 | 2/2015 | Balan et al. |
| 2015/0054742 A1 | 2/2015 | Imoto et al. |
| 2015/0062160 A1 | 3/2015 | Sakamoto et al. |
| 2015/0070332 A1 | 3/2015 | Lee et al. |
| 2015/0106767 A1 | 4/2015 | Abercrombie et al. |
| 2015/0110285 A1 | 4/2015 | Censo et al. |
| 2015/0149929 A1 | 5/2015 | Shepherd et al. |
| 2015/0153833 A1 | 6/2015 | Pinault et al. |
| 2015/0160736 A1 | 6/2015 | Fujiwara |
| 2015/0169076 A1 | 6/2015 | Cohen et al. |
| 2015/0181679 A1 | 6/2015 | Liao et al. |
| 2015/0206321 A1 | 7/2015 | Scavezze et al. |
| 2015/0220150 A1 | 8/2015 | Plagemann et al. |
| 2015/0243100 A1 | 8/2015 | Abovitz et al. |
| 2015/0261318 A1 | 9/2015 | Scavezze et al. |
| 2015/0261659 A1 | 9/2015 | Bader et al. |
| 2015/0269783 A1 | 9/2015 | Yun |
| 2015/0310263 A1 | 10/2015 | Zhang et al. |
| 2015/0312185 A1* | 10/2015 | Langholz .............. H04N 7/142 |
| | | 348/14.03 |
| 2015/0331576 A1 | 11/2015 | Piya et al. |
| 2015/0358088 A1 | 12/2015 | Eim et al. |
| 2016/0054851 A1 | 2/2016 | Kim et al. |
| 2016/0110052 A1 | 4/2016 | Kim et al. |
| 2016/0147308 A1 | 5/2016 | Gelman et al. |
| 2016/0170603 A1 | 6/2016 | Bastien et al. |
| 2016/0231833 A1 | 8/2016 | Gu et al. |
| 2016/0284125 A1* | 9/2016 | Bostick .............. G02B 27/0172 |
| 2016/0292217 A1 | 10/2016 | Sinha et al. |
| 2016/0306431 A1 | 10/2016 | Stafford et al. |
| 2016/0320853 A1 | 11/2016 | Lien et al. |
| 2016/0320926 A1* | 11/2016 | Ganin ................. G06F 3/04886 |
| 2016/0370971 A1 | 12/2016 | Hackett et al. |
| 2016/0378291 A1 | 12/2016 | Pokrzywka |
| 2017/0050542 A1 | 2/2017 | Shigeta et al. |
| 2017/0060230 A1 | 3/2017 | Faaborg et al. |
| 2017/0061600 A1 | 3/2017 | Cole et al. |
| 2017/0097141 A1 | 4/2017 | Hyodo et al. |
| 2017/0099295 A1 | 4/2017 | Ricci |
| 2017/0109936 A1 | 4/2017 | Powderly et al. |
| 2017/0139478 A1 | 5/2017 | Jeon et al. |
| 2017/0168566 A1* | 6/2017 | Osterhout ............ G02B 27/017 |
| 2017/0192513 A1 | 7/2017 | Karmon et al. |
| 2017/0220119 A1 | 8/2017 | Potts et al. |
| 2017/0228130 A1 | 8/2017 | Palmaro |
| 2017/0236492 A1 | 8/2017 | Taki et al. |
| 2017/0255786 A1 | 9/2017 | Krishnamurthi |
| 2017/0262063 A1 | 9/2017 | Blenessy et al. |
| 2017/0263056 A1 | 9/2017 | Leppanen et al. |
| 2017/0278304 A1 | 9/2017 | Hildreth et al. |
| 2017/0287225 A1 | 10/2017 | Powderly et al. |
| 2017/0296363 A1 | 10/2017 | Yetkin et al. |
| 2017/0308118 A1 | 10/2017 | Ito |
| 2017/0308165 A1 | 10/2017 | Erivantcev et al. |
| 2017/0324935 A1 | 11/2017 | Brooks et al. |
| 2017/0329419 A1 | 11/2017 | Dearman et al. |
| 2017/0329488 A1 | 11/2017 | Welker et al. |
| 2017/0337742 A1 | 11/2017 | Powderly et al. |
| 2017/0344220 A1 | 11/2017 | Cook et al. |
| 2017/0357320 A1 | 12/2017 | Chaudhri et al. |
| 2017/0364198 A1 | 12/2017 | Yoganandan et al. |

| | | |
|---|---|---|
| 2018/0004283 A1 | 1/2018 | Mathey-Owens et al. |
| 2018/0033204 A1 | 2/2018 | Dimitrov et al. |
| 2018/0046245 A1 | 2/2018 | Schwarz et al. |
| 2018/0059901 A1 | 3/2018 | Gullicksen |
| 2018/0081456 A1 | 3/2018 | Li et al. |
| 2018/0088677 A1 | 3/2018 | Zhang et al. |
| 2018/0089349 A1 | 3/2018 | Rezgui |
| 2018/0101237 A1 | 4/2018 | Lu |
| 2018/0107278 A1 | 4/2018 | Goel et al. |
| 2018/0113599 A1 | 4/2018 | Yin |
| 2018/0136898 A1 | 5/2018 | Shi et al. |
| 2018/0181245 A1 | 6/2018 | Beck et al. |
| 2018/0303446 A1 | 10/2018 | Schweizer |
| 2018/0307303 A1 | 10/2018 | Powderly et al. |
| 2018/0322701 A1 | 11/2018 | Pahud et al. |
| 2018/0323992 A1 | 11/2018 | Harms et al. |
| 2018/0329492 A1 | 11/2018 | Coppin et al. |
| 2018/0335925 A1 | 11/2018 | Hsiao et al. |
| 2018/0343023 A1 | 11/2018 | Park et al. |
| 2018/0357780 A1 | 12/2018 | Young et al. |
| 2018/0364808 A1 | 12/2018 | Pahud et al. |
| 2019/0050062 A1 | 2/2019 | Chen et al. |
| 2019/0050071 A1 | 2/2019 | Liu et al. |
| 2019/0057531 A1 | 2/2019 | Sareen et al. |
| 2019/0065026 A1 | 2/2019 | Kiemele et al. |
| 2019/0094981 A1 | 3/2019 | Bradski et al. |
| 2019/0102043 A1 | 4/2019 | Lee |
| 2019/0107894 A1 | 4/2019 | Hebbalaguppe et al. |
| 2019/0108668 A1 | 4/2019 | Shenton et al. |
| 2019/0114835 A1 | 4/2019 | Costa et al. |
| 2019/0120593 A1 | 4/2019 | Randles |
| 2019/0129607 A1 | 5/2019 | Saurabh et al. |
| 2019/0130653 A1 | 5/2019 | Kuehne |
| 2019/0143204 A1 | 5/2019 | Aman et al. |
| 2019/0163266 A1 | 5/2019 | Johnson et al. |
| 2019/0212827 A1 | 7/2019 | Kin et al. |
| 2019/0213792 A1 | 7/2019 | Jakubzak et al. |
| 2019/0258318 A1 | 8/2019 | Qin et al. |
| 2019/0278376 A1 | 9/2019 | Kutliroff et al. |
| 2019/0279424 A1 | 9/2019 | Clausen et al. |
| 2019/0286231 A1 | 9/2019 | Burns et al. |
| 2019/0340833 A1 | 11/2019 | Furtwangler et al. |
| 2019/0347865 A1 | 11/2019 | Hackett et al. |
| 2019/0361521 A1 | 11/2019 | Stellmach et al. |
| 2019/0362557 A1 | 11/2019 | Lacey et al. |
| 2019/0362562 A1 | 11/2019 | Benson |
| 2019/0369391 A1 | 12/2019 | Cordesses et al. |
| 2019/0369752 A1 | 12/2019 | Ikeda et al. |
| 2019/0377416 A1 | 12/2019 | Alexander |
| 2019/0392729 A1 | 12/2019 | Lee et al. |
| 2020/0012341 A1 | 1/2020 | Stellmach et al. |
| 2020/0042111 A1 | 2/2020 | Connellan et al. |
| 2020/0082629 A1 | 3/2020 | Jones et al. |
| 2020/0093200 A1 | 3/2020 | Mohapatra et al. |
| 2020/0097077 A1 | 3/2020 | Nguyen et al. |
| 2020/0097091 A1 | 3/2020 | Chou et al. |
| 2020/0103980 A1 | 4/2020 | Katz et al. |
| 2020/0125176 A1 | 4/2020 | Chou et al. |
| 2020/0129850 A1 | 4/2020 | Ohashi |
| 2020/0207358 A1 | 7/2020 | Katz et al. |
| 2020/0218423 A1 | 7/2020 | Ohashi |
| 2020/0221019 A1 | 7/2020 | Jang et al. |
| 2020/0225736 A1 | 7/2020 | Schwarz et al. |
| 2020/0225758 A1 | 7/2020 | Tang et al. |
| 2020/0225830 A1 | 7/2020 | Tang et al. |
| 2020/0226814 A1 | 7/2020 | Tang et al. |
| 2020/0371666 A1 | 11/2020 | Ni et al. |
| 2020/0379576 A1 | 12/2020 | Chen et al. |
| 2020/0387287 A1* | 12/2020 | Ravasz .................. G06F 3/017 |
| 2021/0049360 A1 | 2/2021 | Yildiz et al. |
| 2021/0056750 A1 | 2/2021 | Rowley |
| 2021/0076080 A1 | 3/2021 | Yoo et al. |
| 2021/0076091 A1 | 3/2021 | Shohara |
| 2021/0090331 A1 | 3/2021 | Ravasz et al. |
| 2021/0096726 A1 | 4/2021 | Faulkner et al. |
| 2021/0181863 A1 | 6/2021 | Gatson et al. |
| 2021/0373672 A1 | 12/2021 | Schwarz et al. |
| 2021/0390781 A1 | 12/2021 | Charlton et al. |
| 2022/0083197 A1 | 3/2022 | Rockel et al. |

(56) References Cited

U.S. PATENT DOCUMENTS

| | | | |
|---|---|---|---|
| 2022/0084279 | A1 | 3/2022 | Lindmeier et al. |
| 2022/0121288 | A1 | 4/2022 | Wu et al. |
| 2022/0203996 | A1 | 6/2022 | Katz |
| 2022/0214743 | A1 | 7/2022 | Dascola et al. |
| 2022/0244834 | A1 | 8/2022 | Ravasz et al. |
| 2022/0291755 | A1 | 9/2022 | Lu et al. |
| 2022/0392172 | A1 | 12/2022 | Focke et al. |
| 2023/0040610 | A1 | 2/2023 | Buerli et al. |
| 2023/0082789 | A1 | 3/2023 | Lu et al. |
| 2023/0092282 | A1 | 3/2023 | Boesel et al. |
| 2023/0093979 | A1 | 3/2023 | Stauber et al. |
| 2023/0100689 | A1 | 3/2023 | Chiu et al. |
| 2023/0123518 | A1 | 4/2023 | Sharma |
| 2023/0252737 | A1 | 8/2023 | Dreyer et al. |
| 2023/0274512 | A1 | 8/2023 | Terre et al. |
| 2023/0306695 | A1 | 9/2023 | Rockel et al. |
| 2023/0326144 | A1 | 10/2023 | Insley |
| 2023/0336593 | A1 | 10/2023 | Steptoe et al. |
| 2023/0350497 | A1 | 11/2023 | Fashimpaur et al. |
| 2023/0368620 | A1 | 11/2023 | Brown et al. |
| 2023/0410398 | A1 | 12/2023 | Song et al. |
| 2024/0112415 | A1 | 4/2024 | Tinklepaugh et al. |
| 2024/0153220 | A1 | 5/2024 | Focke et al. |
| 2024/0168542 | A1 | 5/2024 | Klein et al. |
| 2024/0220752 | A1 | 7/2024 | Faaborg et al. |
| 2024/0256032 | A1 | 8/2024 | Holder et al. |
| 2024/0265656 | A1 | 8/2024 | Victor-Faichney et al. |
| 2024/0272764 | A1 | 8/2024 | Victor-Faichney et al. |
| 2024/0289013 | A1 | 8/2024 | Shen |
| 2024/0385692 | A1 | 11/2024 | Shutzberg et al. |
| 2024/0402800 | A1 | 12/2024 | Shutzberg et al. |
| 2025/0078577 | A1 | 3/2025 | Bedri et al. |
| 2025/0103141 | A1 | 3/2025 | Bae et al. |
| 2025/0123691 | A1 | 4/2025 | Edelson et al. |
| 2025/0148728 | A1 | 5/2025 | Randles et al. |
| 2025/0159301 | A1 | 5/2025 | Palaganas et al. |
| 2025/0170475 | A1 | 5/2025 | Jilani |
| 2025/0217818 | A1 | 7/2025 | Woerner et al. |
| 2025/0321630 | A1 | 10/2025 | Zhai et al. |
| 2025/0356601 | A1 | 11/2025 | Insley |

FOREIGN PATENT DOCUMENTS

| | | |
|---|---|---|
| EP | 3155560 A1 | 4/2017 |
| EP | 3155560 B1 | 5/2020 |
| EP | 4145397 A1 | 3/2023 |
| EP | 4471559 A1 | 12/2024 |
| JP | H02197946 A | 8/1990 |
| JP | 2012168646 A | 9/2012 |
| JP | 2014518596 A | 7/2014 |
| JP | 2015511043 A | 4/2015 |
| JP | 2015100032 A | 5/2015 |
| JP | 2016045623 A | 4/2016 |
| JP | 2018516399 A | 6/2018 |
| KR | 20120136719 A | 12/2012 |
| KR | 20170018930 A | 2/2017 |
| TW | 201405411 A | 2/2014 |
| TW | 201814438 A | 4/2018 |
| WO | 2011029986 A1 | 3/2011 |
| WO | 2012092025 A2 | 7/2012 |
| WO | 2015125375 A1 | 8/2015 |
| WO | 2017009707 A1 | 1/2017 |
| WO | 2018198910 A1 | 11/2018 |
| WO | 2018235371 A1 | 12/2018 |

OTHER PUBLICATIONS

Cardoso J., "Comparison of Gesture, Gamepad, and Gaze-Based Locomotion for VR Worlds," Proceedings of the 22nd ACM Conference on Virtual Reality Software and Technology, Nov. 2, 2016, pp. 319-320.
Hincapie-Ramos J.D., et al., "GyroWand: IMU-Based Raycasting for Augmented Reality Head-Mounted Displays," Proceedings of the 3rd Association for Computing Machinery (ACM) Symposium on Spatial User Interaction, Los Angeles, CA, USA, Aug. 8-9, 2015, pp. 89-98.
International Preliminary Report on Patentability for International Application No. PCT/US2020/051763, mailed Mar. 31, 2022, 10 pages.
International Search Report and Written Opinion for International Application No. PCT/US2020/051763, mailed Feb. 3, 2021, 11 Pages.
International Search Report and Written Opinion for International Application No. PCT/US2021/063536 mailed Mar. 22, 2022, 12 pages.
International Search Report and Written Opinion for International Application No. PCT/US2022/036051 mailed Oct. 10, 2022, 11 pages.
Lee M.S., et al., "A Computer Vision System for on-Screen Item Selection by Finger Pointing," In Proceedings of the 2001 IEEE Computer Society Conference on Computer Vision and Pattern Recognition (CVPR), 2001, vol. 1, 8 pages.
Mardanbegi D., et al., "Eyesee Through: Unifying Tool Selection and Application in Virtual Environments," In 2019 IEEE Conference on Virtual Reality and 3D User Interfaces (VR), 2019, pp. 474-483.
Mayer S., et al., "The Effect of Offset Correction and Cursor on Mid-Air Pointing in Real and Virtual Environments," Proceedings of the 2018 CHI Conference on Human Factors in Computing Systems, Montreal, QC, Canada, Apr. 21-26, 2018, pp. 1-13.
Mine M.R., et al., "Moving Objects in Space: Exploiting Proprioception in Virtual-Environment Interaction," In Proceedings of the 24th Annual Conference on Computer Graphics and Interactive Techniques, 1997, pp. 19-26.
Olwal A., et al., "The Flexible Pointer: An Interaction Technique for Selection in Augmented and Virtual Reality," Proceedings of ACM Symposium on User Interface Software and Technology (UIST), Vancouver, BC, Nov. 2-5, 2003, pp. 81-82.
Pfeuffer, et al., "Gaze+ Pinch Interaction in Virtual Reality," ACM, 2017, SUI '17, Brighton, United Kingdom, Oct. 16, 2017, 10 pages.
Renner P., et al., "Ray Casting", Central Facility Labs [Online], [Retrieved on Apr. 7, 2020], 2 pages, Retrieved from the Internet: URL:https://www.techfak.uni-bielefeld.de/~tpfeiffe/lehre/VirtualReality/interaction/ray_casting.html.
Schweigert R., et al., "EyePointing: A Gaze-Based Selection Technique," Proceedings of Mensch and Computer, Hamburg, Germany, Sep. 8-11, 2019, pp. 719-723.
Tomberlin M., et al., "Gauntlet: Travel Technique for Immersive Environments using Non-Dominant Hand," IEEE Virtual Reality (VR), Mar. 18, 2017, pp. 299-300.
"Unity Gets Toolkit for Common AR/VR Interactions," Unity XR interaction Toolkit Preview [Online], Dec. 19, 2019 [Retrieved on Apr. 7, 2020], 1 page, Retrieved from the Internet: URL: http://youtu.be/ZPhv4qmT9EQ.
Billinghurst M., et al., "Hands in Space Gesture Interaction with Augmented-Reality Interfaces," IEEE Computer Graphics and Applications, Jan. 2014, vol. 34, No. 01, 5 pages.
Office Action mailed Oct. 20, 2023 for Chinese Application No. 202080039024.1, filed May 29, 2020, 15 pages.
Office Action mailed Sep. 20, 2023 for European Patent Application No. 20746759.8, filed on May 29, 2020, 5 pages.
European Search Report for European Patent Application No. 23155919.6, dated Jun. 13, 2023, 6 pages.
Fox B., et al., "Designing Singlehanded Shortcuts for VR AR," May 10, 2018, Retrieved from the Internet: URL: https://www.roadtovr.com/leap-motion-designing-single-handed-shortcuts-for-vr-ar/, [Retrieved on Oct. 27, 2020], 18 pages.
Huang Y., et al., "Evaluation of a Hybrid of Hand Gesture and Controller Inputs in Virtual Reality," International Journal of Human-Computer Interaction, Aug. 26, 2020, vol. 37, No. 2, pp. 169-180.
International Search Report and Written Opinion for International Application No. PCT/US2020/035384, mailed Sep. 7, 2020, 10 Pages.
International Search Report and Written Opinion of International Application No. PCT/US2020/035998, mailed Sep. 30, 2020, 16 pages.

(56) References Cited

OTHER PUBLICATIONS

Kim H., et al., "Swag Demo Smartwatch Assisted Gesture Interaction for Mixed Reality Head-Mounted Displays," 2018 IEEE International Symposium on Mixed and Augmented Reality, ISMAR-Adjunct 2018, Oct. 16, 2018, pp. 428-429.

Lang B., "Leap Motion Virtual Wearable AR Prototype is a Potent Glimpse at the Future of Your Smartphone," Mar. 24, 2018, Retrieved from the Internet: URL: https://www.roadtovr.com/leap-motion-virtual-wearable-ar-prototype-glimpse-of-future-smartphone/, [Retrieved on Oct. 27, 2020], 6 pages.

Matsuda K., "Augmented City 3D [Official]," YouTube, Aug. 20, 2010, Retrieved from the Internet: URL: https://www.youtube.com/watch?v=3TL80ScTLIM, 1 page.

Newton A., "Immersive Menus Demo," YouTube, Oct. 8, 2017, Retrieved from the Internet: URL: https://www.youtube.com/watch?v =_ow1RboHJDY, 1 page.

Notice of Allowance mailed Apr. 13, 2022 for U.S. Appl. No. 16/435,110, filed Jun. 7, 2019, 10 pages.

Office Action mailed Sep. 6, 2023 for Taiwan Application No. 109118112, filed May 29, 2020, 9 pages.

Office Action mailed Sep. 19, 2023 for European Patent Application No. 20747255.6, filed on Dec. 7, 2021, 6 pages.

International Search Report and Written Opinion for International Application No. PCT/US2023/017990, mailed Jul. 10, 2023, 9 pages.

International Preliminary Report on Patentability for International Application No. PCT/US2023/017990, mailed Oct. 17, 2024, 8 pages.

Office Action mailed Sep. 17, 2024 for Japanese Patent Application No. 2021-557668, filed on May 29, 2020, 3 pages.

Office Action mailed Feb. 20, 2024 for Japanese Patent Application No. 2021-557668, filed on May 29, 2020, 4 pages.

Clarke C., et al., "Enhanced Virtual Private Social Networks: Implementing User Content Confidentiality," IEEE Xplore, The 8th International Conference for Internet Technology and Secured Transactions, Dec. 1, 2013, pp. 306-312.

Final Office Action mailed May 29, 2025 for U.S. Appl. No. 18/220,148, filed Jul. 10, 2023, 14 pages.

Ganesh D., et al., "Protection of Shared Data Among Multiple Users for Online Social Networks," IEEE Xplore, The 8th International Conference on Contemporary Computing and Informatics, Nov. 1, 2014, pp. 768-773.

Gau M., et al., "Responsive Open Space: Sound and Image in Public Spaces," 2012 18th International Conference on Virtual Systems and Multimedia, Sep. 2-5, 2012, pp. 541-544.

International Preliminary Report on Patentability for International Application No. PCT/US2016/055499, mailed Apr. 18, 2019, 7 Pages.

International Search Report and Written Opinion for International Application No. PCT/US2016/055499, mailed Jul. 5, 2017, 08 Pages.

Non-Final Office Action mailed Jul. 8, 2025 for U.S. Appl. No. 18/605,162, filed Mar. 14, 2024, 9 pages.

Non-Final Office Action mailed Sep. 26, 2024 for U.S. Appl. No. 18/404,825, filed Jan. 4, 2024, 19 pages.

Notice of Reasons for Refusal mailed Sep. 1, 2020 for Japanese Application No. 2019-518037, filed Oct. 5, 2016, 8 Pages.

Notice of Reasons for Rejection mailed Mar. 16, 2021 for Japanese Application No. 2019-518037, filed Oct. 5, 2016, 6 Pages.

Notification of First Office Action mailed Jan. 5, 2022 for Chinese Application No. 201680091197.1, filed Oct. 5, 2016, 15 pages.

Office Action mailed Jun. 16, 2022 for Chinese Application No. 201680091197.1, filed Oct. 5, 2016, 13 pages.

Office Action mailed May 21, 2023 for Korean Application No. 10-2019-7012801, filed Oct. 5, 2016, 3 pages.

Office Action mailed Mar. 24, 2025 for European Patent Application No. 23155919.6, filed on Feb. 9, 2023, 4 pages.

Office Action mailed Nov. 27, 2022 for Korean Application No. 10-2019-7012801, filed Oct. 5, 2016, 10 pages.

Office Action mailed Mar. 31, 2025 for Korean Application No. 10-2022-7000363, filed May 29, 2020, 9 pages.

Pettifer S., et al., "A Collaborative Access Model for Shared Virtual Environments," Proceedings Tenth IEEE International Workshop on Enabling Technologies: Infrastructure for Collaborative Enterprises, WET ICE 2001, Jun. 20-22, 2001, pp. 257-262.

Shiozawa H., et al., "Collaborative Workspace Visualization Using Background and Perspective," Transactions of Information Processing Society of Japan, Nov. 15, 1999, vol. 40 (11), pp. 3823-3833.

International Search Report and Written Opinion for International Application No. PCT/US2025/031396, mailed Jul. 24, 2025, 12 pages.

Kider Jr J.T., et al., "A Data-driven Appearance Model for Human Fatigue," Proceedings of the 2011 ACM SIGGRAPH/Eurographics Symposium on Computer Animation, Aug. 5, 2011, pp. 119-128.

Notice of Allowance mailed Nov. 4, 2025 for U.S. Appl. No. 18/220,148, filed Jul. 10, 2023, 8 pages.

Notice of Allowance mailed Nov. 25, 2025 for U.S. Appl. No. 18/220,148, filed Jul. 10, 2023, 2 pages.

Office Action mailed Nov. 19, 2025 for European Patent Application No. 23155919.6, filed on Feb. 9, 2023, 8 pages.

* cited by examiner

Snap to Send

300

301
302
303

ULTRA LOW FRICTION GESTURAL INTERFACE FOR ARTIFICIAL REALITY

CROSS REFERENCE TO RELATED APPLICATIONS

This application claims priority to U.S. Provisional Patent Application No. 63/328,982, titled "Ultra Low Friction Gestural interface for Artificial Reality," which is herein incorporated by reference in its entirety.

BACKGROUND

Artificial reality (XR) environments expand users' experiences beyond their real world, allow them to learn and play in new ways, and help them connect with other people. However, while existing XR systems often provide compelling features, they also can include overly complicated user actions ("frictions") that users could face while using these XR systems at the same time as they interact with the real world. As an example of these frictions, some existing applications draw their users' attention to the application's UI and thus away from whatever real-world task the user is trying to accomplish. Consider a voice messaging application that delivers incoming messages to the user and allows the user to listen and respond to the messages. The existing UI's gaze to tap interface produces "high friction" because it requires the user to repeatedly gaze at menu options in order to select them, these gazes taking the user's visual focus away from the real-world.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Aspects of the present disclosure are directed to a gesture system and techniques for providing "ultra low friction" (ULF) gestures, e.g., for controlling an artificial reality messaging application. The gesture system can recognize ULF gestures such as a "pinch" and "snap" combination where initially a pinch gesture (i.e., bringing the user's thumb tip and tip or side of another finger together) is mapped to an initial action and a following snap gesture (i.e., sliding the thumb off or along the other finger used in the pinch gesture) is mapped to the most common command performed in the current context following the pinch gesture.

For example, a notification of a calendar event alert may be received by an artificial reality device, which displays it for the user. A pinch gesture on a "map to event location" control can cause the artificial reality device to bring up a map in relation to the calendar evet, e.g., showing a path from the user's current location to the location of the calendar event. The most common response to viewing such a map is enter the location in a GPS routing system, so the snap gesture is mapped to this action of starting the navigation system. When the user makes the snap gesture, the routing system is enabled and begins providing directions to the event. However, the user can have other options, such as an un-pinch gesture to close the map or a tug-right gesture (i.e., holding the pinch gesture but moving it to the right) can open an interface to select a different starting point for navigation.

The gesture system can track user contexts (e.g., current activity, recent actions in the artificial reality environment, etc.) It can then determine which commands are most common following a pinch in various contexts and can set the snap action to the most common action. In some implementations, the gesture system can also set the second most common gesture to the tug right gesture or can identify a common "exit" action which is mapped to the tug right gesture.

In some implementations, the gesture system can provide visual affordances to the user to indicate which gestures will provide what result. For example, a drawing of a pinch gesture can be paired with a label telling what the pinch will do and a drawing of a snap gesture can be paired with a label telling what the snap gesture will do.

Figure 1A:
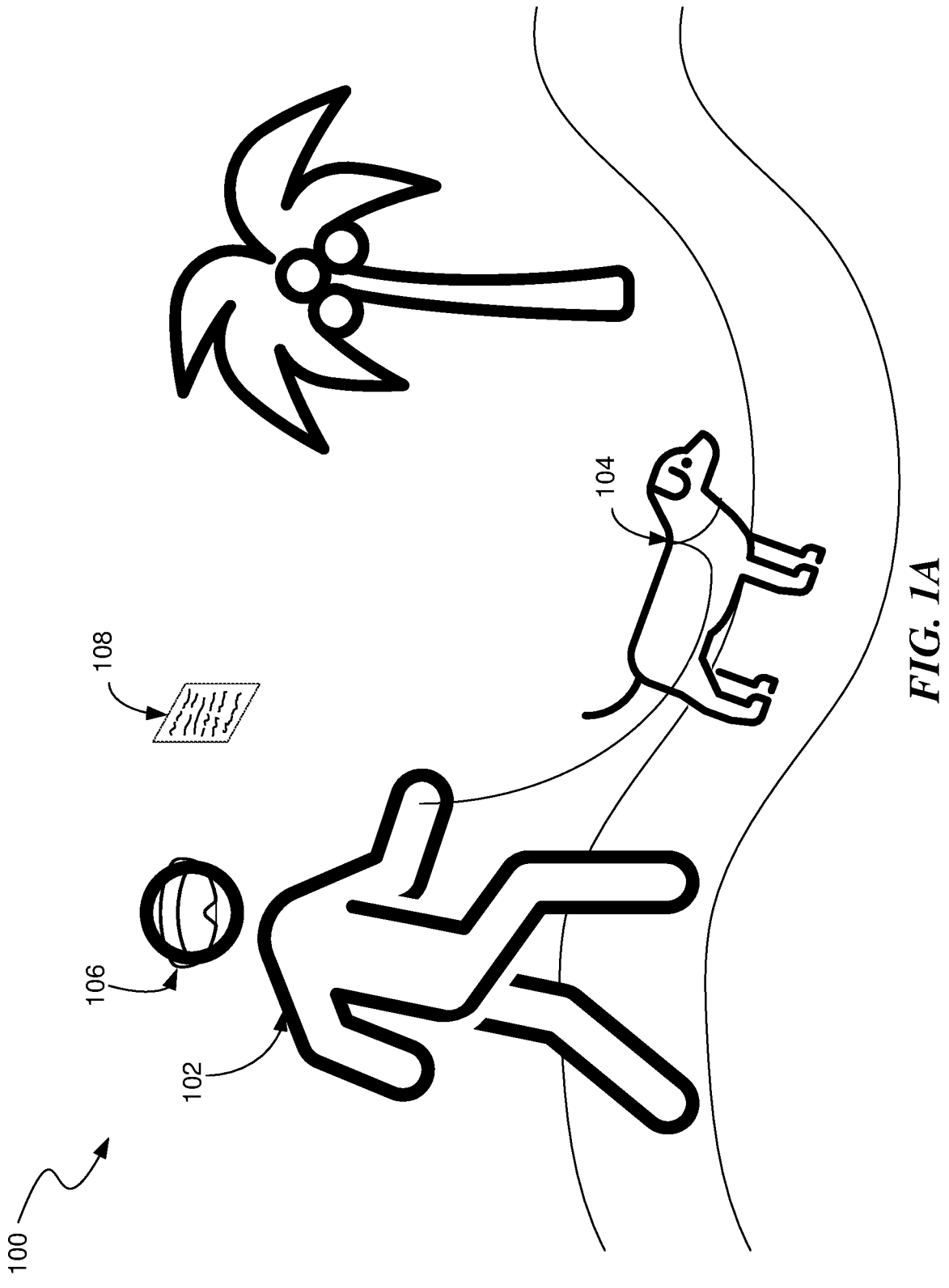
FIG. 1A is a conceptual drawing of a user walking a dog in a mixed reality environment.

FIG. 1A presents a scenario 100 in a "mixed reality" environment. A user 102 is walking a dog 104 in the real world. The user 102 is wearing a head-mounted display (HMD) 106. (See a discussion of an example HMD in the text accompanying FIG. 4B below.) Through the HMD 106, the user 102 sees the real world but at the same time may interact with aspects of an XR environment overlaid onto the real-world view. In the particular scenario 100, the user 102 sees a UI 108 displayed by an XR messaging application. While the user 102 interacts with the XR messaging application via its UI 108, the user 102 can pay attention to the real world in order to avoid hazards while walking the dog 104.

Figure 1B:
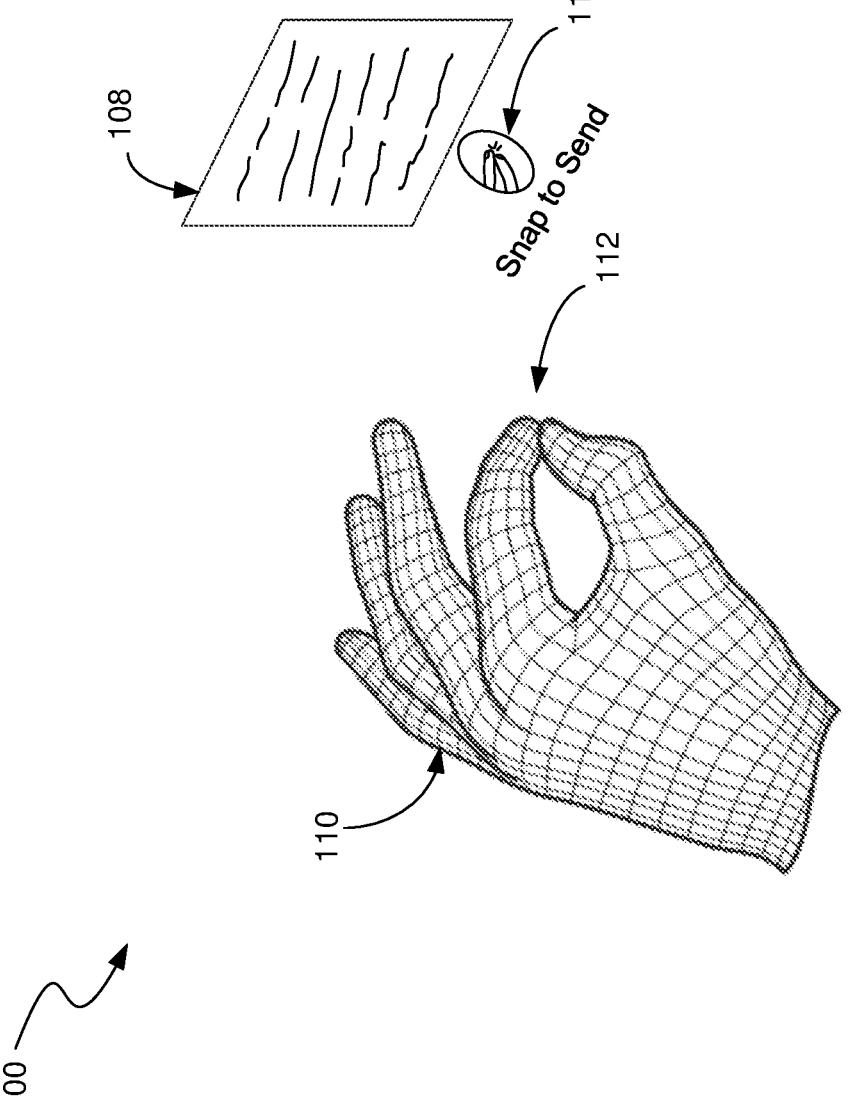
FIG. 1B is a conceptual drawing of a user using a pinch gesture to begin recording a voice message.
Figure 1B:
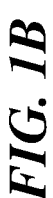

In FIG. 1B the user 102 (represented here by his hand 110) is alerted by the messaging application to an incoming message (e.g., voice, text, video, etc.) The alert can be text, sound, etc. To avoid having to interact with extensive menus of the messaging application's UI 108, aspects of the present disclosure allow the user 102 to begin recording a voice response by making a pinch gesture 112 directed at the UI display 108 of the messaging application. A gesture-tracking system in his HMD 106 notes this gesture 112, interprets it, and sends the interpretation to the messaging application which responds by beginning to record a voice response from the user 102. The user can know that a following snap gesture (see FIG. 1C) will send the recording due to the displayed visual affordance 113.

Figure 1C:
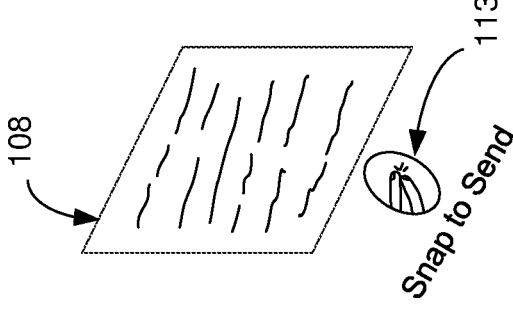
FIG. 1C is a conceptual drawing of a user using a thumb-swipe gesture to stop recording a message and to send it immediately.
Figure 1C:
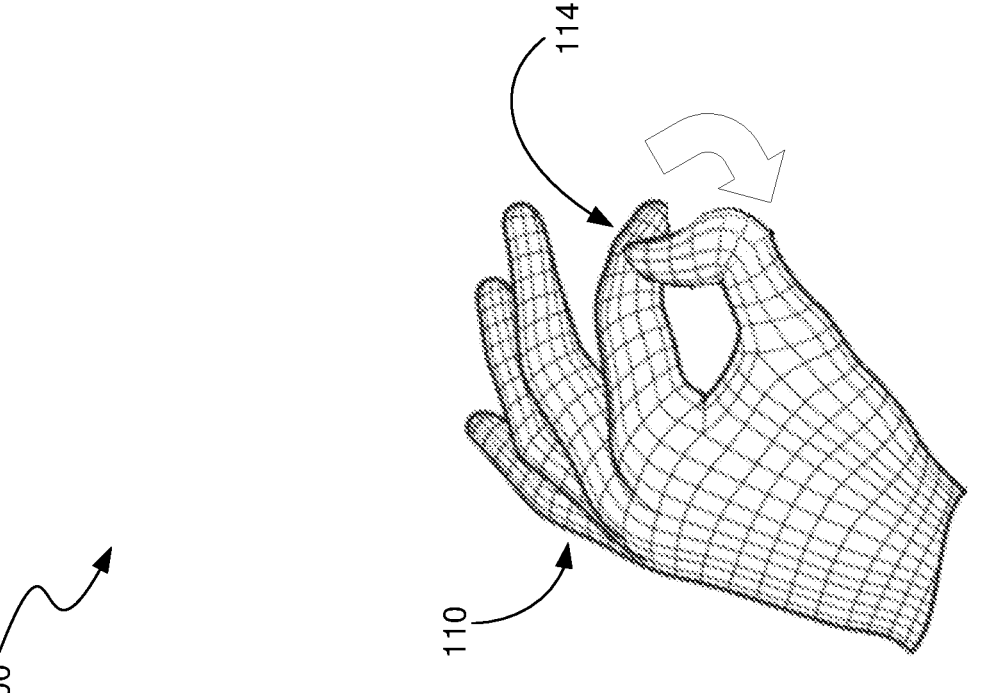

In FIG. 1C, the user 102 decides that his response message is complete, and he wishes to send it immediately without pausing to edit it. He can indicate this by making a "snap" or "thumb swipe" gesture 114. The user can know to do this due to the displayed visual affordance 113, indicating that performing a snap gesture will send the current recording. The messaging application's UI 108 also supports other gestural commands. For example, releasing the pinch 112 (from FIG. 1B) can stop the recording but does not immediately send the message, allowing for reviewing and editing. A "tug left" gesture can command the gesture system to discard the unsent response message.

Figure 2:
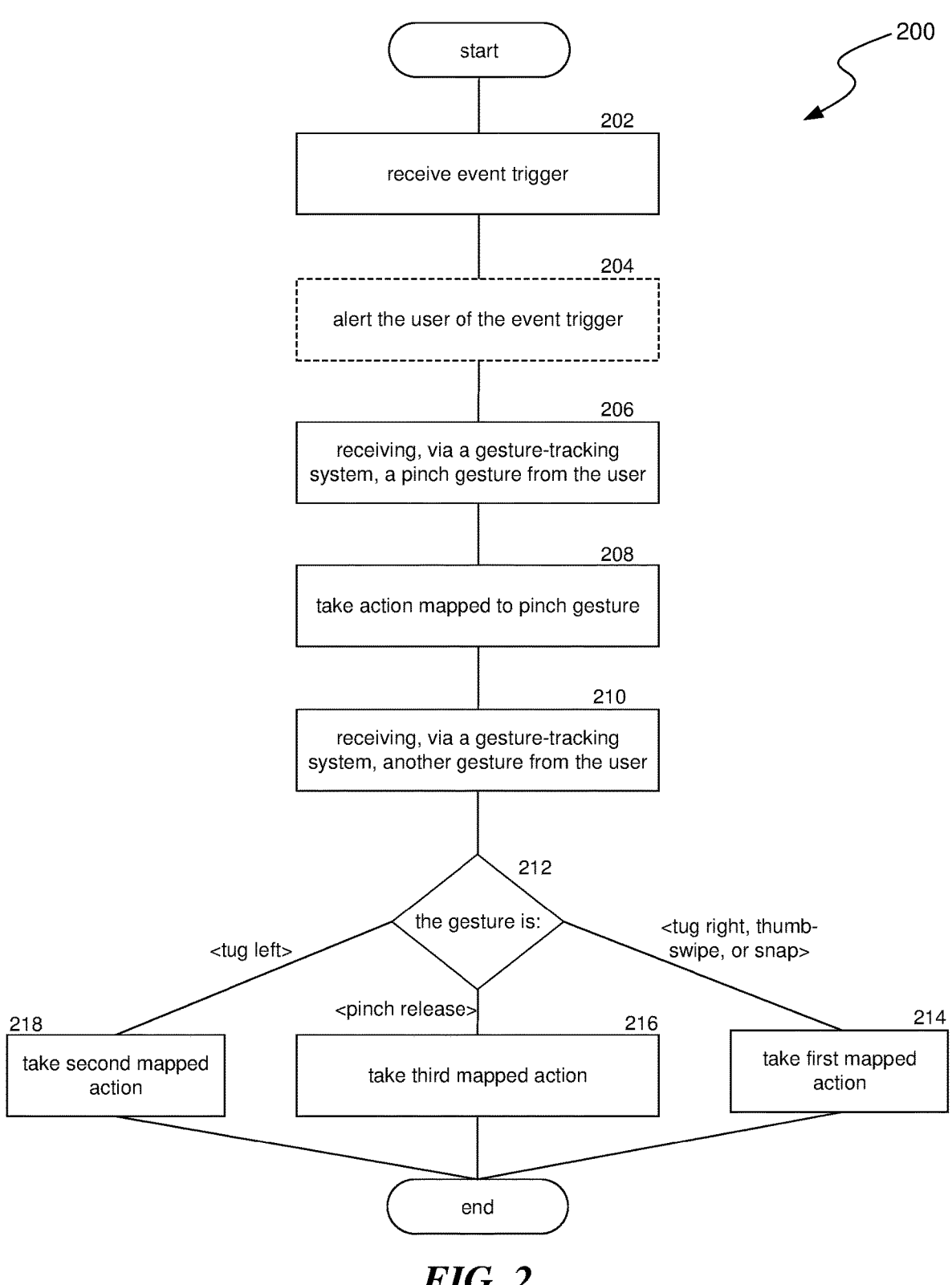
FIG. 2 is a flow diagram illustrating a process used in some implementations of the present technology for responding to gestural input.

FIG. 2 is a flow diagram illustrating a process 200 used in some implementations for receiving and responding to gestural input. The process 200 is implemented by a gesture-UI-equipped artificial reality messaging application when a user of that application enters an XR environment by, for example donning her head-mounted display 106. (See FIG. 4B and accompanying text.)

At block 202, process 200 receives an event trigger. The event trigger can be any event mapped to an action in response to a pinch gesture, such as an incoming message being received for the current user, a notification to be displayed to the current user, a user command being provided, an application running in the artificial reality environment creating a virtual object in the user's field of view, etc. Messages, for example, of any type of modality can be received. The event trigger can be initiated from various sources such as operating system modules (e.g., an alarm going off, notification of system resources, etc.), user action, third-party applications running on the artificial reality device, or network events being received at the artificial reality device.

While any block can be removed or rearranged in various implementations, block 204 is shown in dashed lines to indicate there are specific instances where block 204 is skipped. At block 204, process 200 alerts the user in relation to the event triggers, e.g., to the user of the presence of the incoming message. In order to avoid distracting the user and forcing her to focus on a display screen of the messaging application, in some variations, the user is notified by a sound produced in her HMD 106 instead of, or in addition to, a static visual notification. A blinking notification can also notify the user without forcing her to divert her attention away from the real world for too long. In some cases, the alert can include one or more controls that the user can interact with, e.g., with a pinch gesture.

At block 206, process 200 can receive a pinch gesture, related to the event trigger, via a gesture-tracking system associated with the user's HMD 106. The gesture can be recognized by a gesture recognition system, e.g., one that ingests one or more of images of the user's hands, IMU data, sensor data from a hand or wrist mounted wearable, etc. For example, a machine learning model may be trained to take images of the user's hand and provide a result of a hand pose defining the location of the user's hand and relationships between parts of the user's hand (e.g., relational values or a 3D model of the user's hand). In some implementations, the user may also or alternatively be wearing a device that measures distances between parts of the user's hand to determine the user's had pose. In yet further implementations, a wearable device may produce electrical signals and read how they flow through a user's wrist to get values representing an internal state of the user's wrist which are used to determine a corresponding pose of the user's hand. The pinch gesture can be in relation to the event trigger by the pinch gesture being directed at (i.e., the user's hand was pointed at) a UI display provided in response to the event trigger. Here, a "pinch" gesture is formed when the user touches the tip of her thumb to the tip of another finger, e.g., her index or middle finger or to the side of that finger (e.g., the place on the user's finger between the tip and the first knuckle). One form of pinch gesture is illustrated in FIG. 1B.

At block 208, process 200 interprets the pinch as a command in relation to the trigger event. For example, process 200 can interpret a pinch on a "respond" control provided in a message alert as a command to begin recording a voice response message. The recording of block 208 continues as long as the user holds the pinch. In some variations, the user can add to the new message a still photograph or short video taken by the HMD's camera. In other cases, the pinch can be mapped to other actions for a message or for a different event trigger. For example, if the event trigger is a display of a newly discovered virtual object, the pinch can select that new virtual object. As another example, if the event trigger is a user's gaze falling on a target object to select it, causing other controls to appear, the pinch on a give control can activate that control.

At block 210, process 200 receives another gesture from the user. There are a number of possibilities here as indicated by the decision block 212. The gesture can be recognized by the gesture recognition system, e.g., one that ingests one or more of images of the user's hands, IMU data, sensor data from a hand or wrist mounted wearable, etc., as discussed above. The gesture recognition system can then map the received data to a gesture, e.g., by applying a machine learning model trained on training data that pairs one or more of these data types with gesture selections. If the recognized gesture is a release of the pinch from block 206, process 200 can continue to block 216; if the gesture is a snap, tug right, or thumb-swipe, process 200 can continue to block 214; and if the gesture is a tug left process 200 can continue to block 218. In other implementations, other gestures can be mapped to the transition between block 212 and one of blocks 214-218.

At block 214, process 200 has received a "tug right," "snap," or "thumb swipe" gesture. A tug right is formed by holding the pinch gesture from block 206 and pulling it to the user's right. A snap or thumb swipe is created starting from a pinch and either sliding the tip of the thumb off the connection between the thumb tip and the other finger tip, e.g., the user has moved, above a threshold speed, the tip of the user's thumb away and to the side from the tip of the other of the other of the user's fingers (i.e., a snap gesture) or sliding the thumb tip along the side of the other finger thumb is in contact with in the pinch e.g., the user has moved the tip of the user's thumb away from the tip of the other of the other of the user's fingers and along a side of that other of the user's fingers. The "tug right," "snap," or "thumb swipe" gesture can be mapped to a first action. In some implementations, this can be a default action for the event trigger received at block 202. In other implementations, the first action can be an action previously determined to be most common (for the current user or for users generally) following the context the pinch was made at block 206. For example, when the pinch is to record a message reply, the most common action mapped to the "tug right," "snap," or "thumb swipe" gesture can be to send the newly recorded response message immediately, when it's been determined that this is the most common action users take following a pinch to record a reply to a message. As another example, when the pinch is to select a minimized virtual object in the artificial reality environment, the determined most common action, and thus the action mapped to the "tug right," "snap," or "thumb swipe" gesture, can be to expand the minimized virtual object to a full version. As yet a further example, when the pinch is to select a representation of another person in the area (e.g., a version of their avatar in the area, a picture of them, an item associated with the other person, the person themselves), causing a UI for that person to be displayed, the most common action mapped to the "tug right" "snap," or "thumb swipe" gesture can be to bring up text, call, or other messaging interface to that person.

At block 218, process 200 has received a "tug left" gesture. A tug left is formed by holding the pinch gesture from block 206 and pulling it to the user's left. The tug left gesture can be mapped to a second action, e.g., the action either second most common following the context the pinch was made at block 206 or an action designated as a delete, discard, or cancel action for the action taken at block 208. For example, the tug left gesture for the messaging application can be to delete or discard the recorded message. As another example, the tug left gesture for a pinch that selected a virtual object can be to hide or close the virtual object. As a further example, the tug left gesture for a pinch that selected another person can be to close social media objects associated with that other person.

At block 216, process 200 has received a pinch release, that is, the user stops holding her thumb tip against her other fingertip. The pinch release gesture can be mapped to a third action, e.g., the action either third most common following the context the pinch was made at block 206 or an action designated as a drill down or take a more complicated action for the action taken at block 208. For example, for the messaging application, process 200 can respond to the pinch release by entering an editing mode where the user can review, edit, and eventually discard or send the recorded message. To enable editing of the message, the messaging application can, in some variations, support a ULF UI with a few basic gestural commands. For example, after entering the editing mode (possibly by making another pinch gesture while at block 216), gestures can be mapped to fast forwarding through the message, reversing, redacting a section, adding an effect, deleting the message entirely, etc. As another example, the pinch release gesture for a pinch that selected a virtual object can be to bring up a set of menus or controls for the selected virtual object. As a further example, the pinch release gesture for a pinch that selected another person can be to pull up a profile or interaction menu for the that other person.

In some implementations, the mapping of the gesture to an action at one or more of blocks 214-218 can be based on a context that was recognized when the pinch was made at block 206. For example, the mapping can define, for each gesture type, at a first level an event trigger, and below that a set of contexts, where process 200 takes the action, for the gesture of block 214, 216, or 218, that matches both the event trigger received at block 202 and the context determined for when the pinch gesture was made at block 206. For example, different actions can be mapped to the snap gesture, for the message received event trigger, depending on contexts. Contexts can be any discernible state such as where the user is looking, what actions the user is taking (e.g., sitting, walking, driving, watching TV, etc.), who else has been identified to be in the vicinity, what the user is doing (e.g., other gestures) with her other hand, a history or relationship between the current user and a user related to the event trigger (e.g., a sender of the message), a determined user physical or emotional state (e.g., pulse, eye movement, temperature, happy, sad, excited, bored, etc.), time of day, date, weather conditions, where the artificial reality device is geographically, an identified type of event occurring around the artificial reality device, recent actions taken by the current user, etc. These contexts can be determined in various ways such as through images, movement data, and/or audio taken of the surrounding area or of the user and provided to one or more machine learning models trained to identify these types of contexts (e.g., object recognizers, action recognizers, people recognizers, emotion identifiers, etc.), from network data supplied from external sources that specify the current context (e.g., time, date, weather condition), from wireless communications with other devices in the area, from internal sensors (e.g., GPS systems, inertial motion unit (IMU) systems, heat sensors, depth sensors, etc.), etc.

In some variations, process 200 allows a user to use the messaging application's gesture-enabled UI to create a new message rather than only to respond to an existing message. For example, the user can pinch select one of her contacts, and then use specific gestures to indicate that she wishes to create a new message for that contact, to review it, edit it as in block 216, and ultimately send it. In some variations, hand gestures can accompany voice commands that are interpreted by a natural-language processor and sent to the messaging application.

In some variations, a user can pinch to select a menu of related actions. Then particular gestures are mapped to particular default actions within the menu. If, for example, the user pinch selects an icon notifying her that a new message has arrived, a thumb swipe can be interpreted as the default action of dismissing the notification without discarding the new message.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Previous "gaze to tap" systems require users to divert their attention away from the real world while interacting with XR applications. This could lead to hazardous situations for a user in a mixed reality environment or produce annoying delays while the user switches between XR applications and the real world. The ULF gestural UI systems and methods disclosed herein are expected to overcome these deficiencies in existing systems. Through the simplicity of the gestural interface, a user can fully interact with an XR messaging system while maintaining focus on the real world. There is no analog among previous technologies for this ease of combined user interaction in a mixed reality environment. By allowing users to maintain their focus on the real world, the ULF UI allows users to more fully participate in the benefits of XR systems, and, in consequence, enhances the value of the XR environments and the systems that support them.

Figure 3:
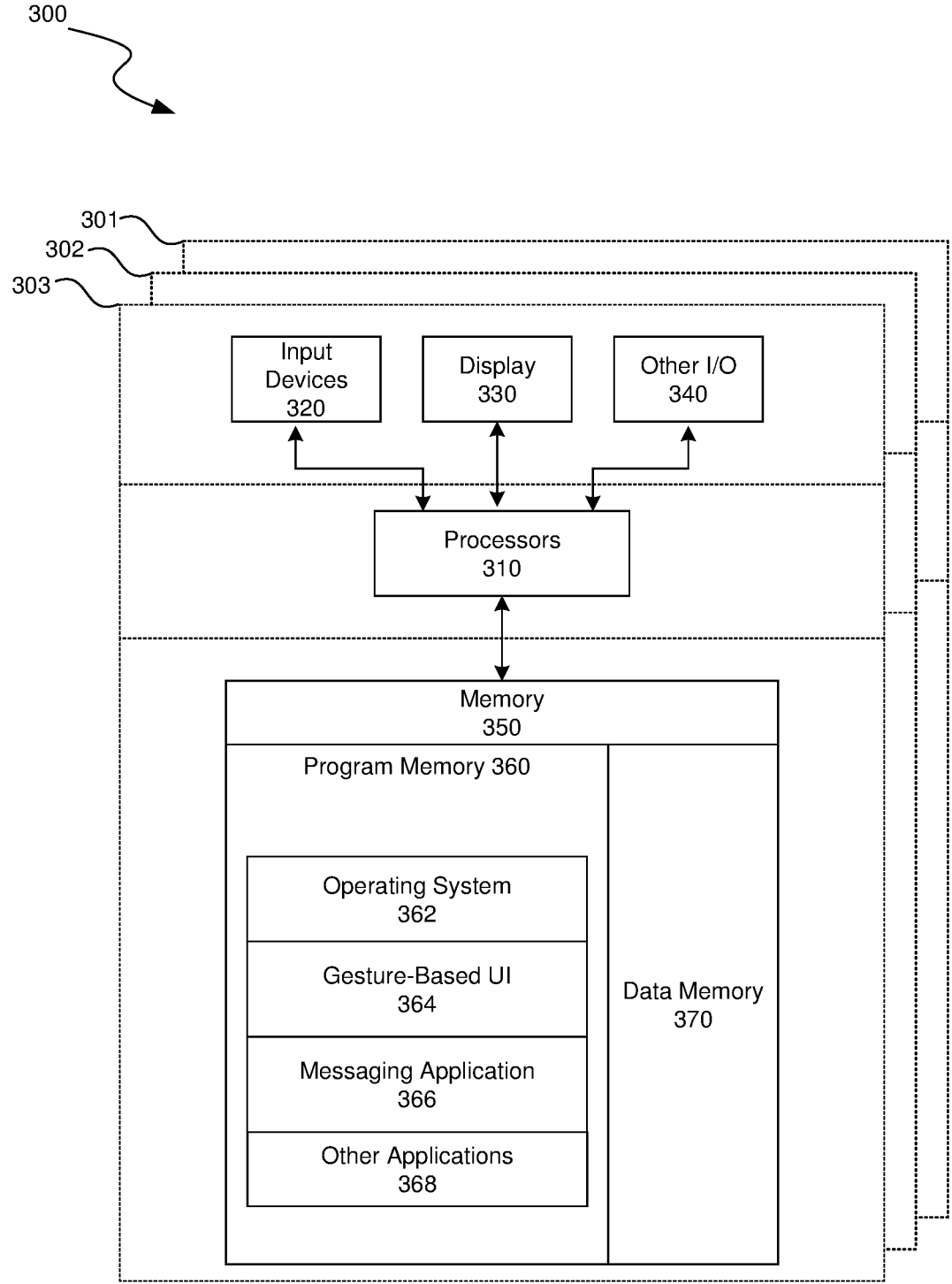
FIG. 3 is a block diagram illustrating an overview of devices on which some implementations of the present technology can operate.

Several implementations are discussed below in more detail in reference to the figures. FIG. 3 is a block diagram illustrating an overview of devices on which some implementations of the disclosed technology can operate. The devices can comprise hardware components of a computing system 300 that interprets gestural input for a messaging application. In various implementations, computing system 300 can include a single computing device 303 or multiple computing devices (e.g., computing device 301, computing device 302, and computing device 303) that communicate over wired or wireless channels to distribute processing and share input data. In some implementations, computing system 300 can include a stand-alone headset capable of providing a computer created or augmented experience for a user without the need for external processing or sensors. In other implementations, computing system 300 can include multiple computing devices such as a headset and a core processing component (such as a console, mobile device, or server system) where some processing operations are performed on the headset and others are offloaded to the core processing component. Example headsets are described below in relation to FIGS. 4A and 4B. In some implementations, position and environment data can be gathered only by sensors incorporated in the headset device, while in other implementations one or more of the non-headset computing devices can include sensor components that can track environment or position data.

Computing system 300 can include one or more processor(s) 310 (e.g., central processing units (CPUs), graphical processing units (GPUs), holographic processing units (HPUs), etc.) Processors 310 can be a single processing unit or multiple processing units in a device or distributed across multiple devices (e.g., distributed across two or more of computing devices 301-303).

Computing system 300 can include one or more input devices 320 that provide input to the processors 310, notifying them of actions. The actions can be mediated by a hardware controller that interprets the signals received from the input device and communicates the information to the processors 310 using a communication protocol. Each input device 320 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 310 can be coupled to other hardware devices, for example, with the use of an internal or external bus, such as a PCI bus, SCSI bus, or wireless connection. The processors 310 can communicate with a hardware controller for devices, such as for a display 330. Display 330 can be used to display text and graphics. In some implementations, display 330 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 340 can also be coupled to the processor, such as a network chip or card, video chip or card, audio chip or card, USB, firewire or other external device, camera, printer, speakers, CD-ROM drive, DVD drive, disk drive, etc.

In some implementations, input from the I/O devices 340, such as cameras, depth sensors, IMU sensor, GPS units, LiDAR or other time-of-flights sensors, etc. can be used by the computing system 300 to identify and map the physical environment of the user while tracking the user's location within that environment. This simultaneous localization and mapping (SLAM) system can generate maps (e.g., topologies, girds, etc.) for an area (which may be a room, building, outdoor space, etc.) and/or obtain maps previously generated by computing system 300 or another computing system that had mapped the area. The SLAM system can track the user within the area based on factors such as GPS data, matching identified objects and structures to mapped objects and structures, monitoring acceleration and other position changes, etc.

Computing system 300 can include a communication device capable of communicating wirelessly or wire-based with other local computing devices or a network node. The communication device can communicate with another device or a server through a network using, for example, TCP/IP protocols. Computing system 300 can utilize the communication device to distribute operations across multiple network devices.

The processors 310 can have access to a memory 350, which can be contained on one of the computing devices of computing system 300 or can be distributed across of the multiple computing devices of computing system 300 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 350 can include program memory 360 that stores programs and software, such as an operating system 362, a gesture-based UI 364 that front-ends a messaging application 366, and other application programs 368. Memory 350 can also include data memory 370 that can include, e.g., parameters for interpreting gestures, configuration data, settings, user options or preferences, etc., which can be provided to the program memory 360 or any element of the computing system 300.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 4A:
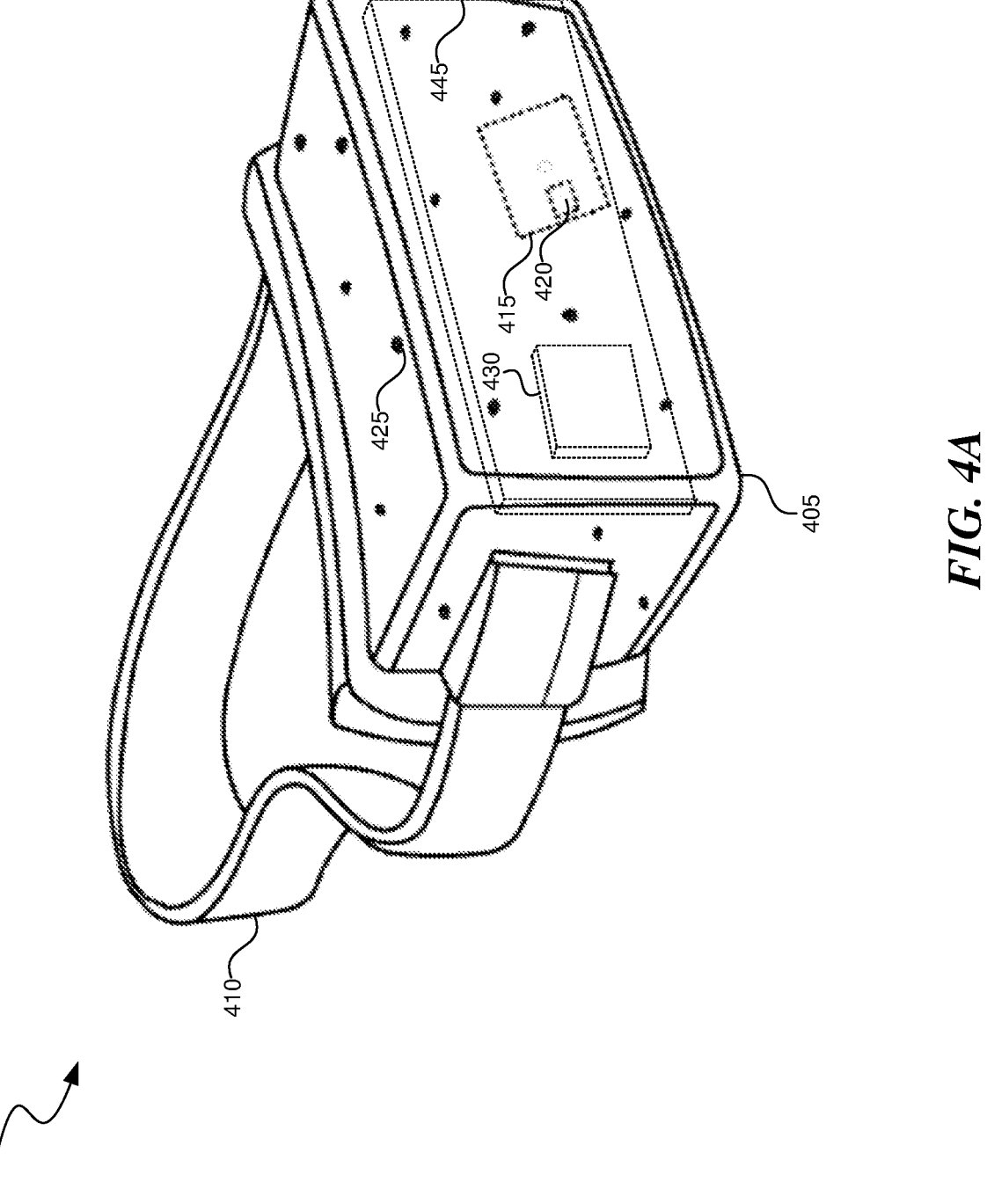
FIG. 4A is a wire diagram illustrating a virtual reality headset which can be used in some implementations of the present technology.

FIG. 4A is a wire diagram of a virtual reality head-mounted display (HMD) 400, in accordance with some embodiments. The HMD 400 includes a front rigid body 405 and a band 410. The front rigid body 405 includes one or more electronic display elements of an electronic display 445, an inertial motion unit (IMU) 415, one or more position sensors 420, locators 425, and one or more compute units 430. The position sensors 420, the IMU 415, and compute units 430 may be internal to the HMD 400 and may not be visible to the user. In various implementations, the IMU 415, position sensors 420, and locators 425 can track movement and location of the HMD 400 in the real world and in an artificial reality environment in three degrees of freedom (3DoF) or six degrees of freedom (6DoF). For example, the locators 425 can emit infrared light beams which create light points on real objects around the HMD 400. As another example, the IMU 415 can include e.g., one or more accelerometers, gyroscopes, magnetometers, other non-camera-based position, force, or orientation sensors, or combinations thereof. One or more cameras (not shown) integrated with the HMD 400 can detect the light points. Compute units 430 in the HMD 400 can use the detected light points to extrapolate position and movement of the HMD 400 as well as to identify the shape and position of the real objects surrounding the HMD 400.

The electronic display 445 can be integrated with the front rigid body 405 and can provide image light to a user as dictated by the compute units 430. In various embodiments, the electronic display 445 can be a single electronic display or multiple electronic displays (e.g., a display for each user eye). Examples of the electronic display 445 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 400 can be coupled to a core processing component such as a personal computer (PC) (not shown) and/or one or more external sensors (not shown). The external sensors can monitor the HMD 400 (e.g., via light emitted from the HMD 400) which the PC can use, in combination with output from the IMU 415 and position sensors 420, to determine the location and movement of the HMD 400.

Figure 4B:
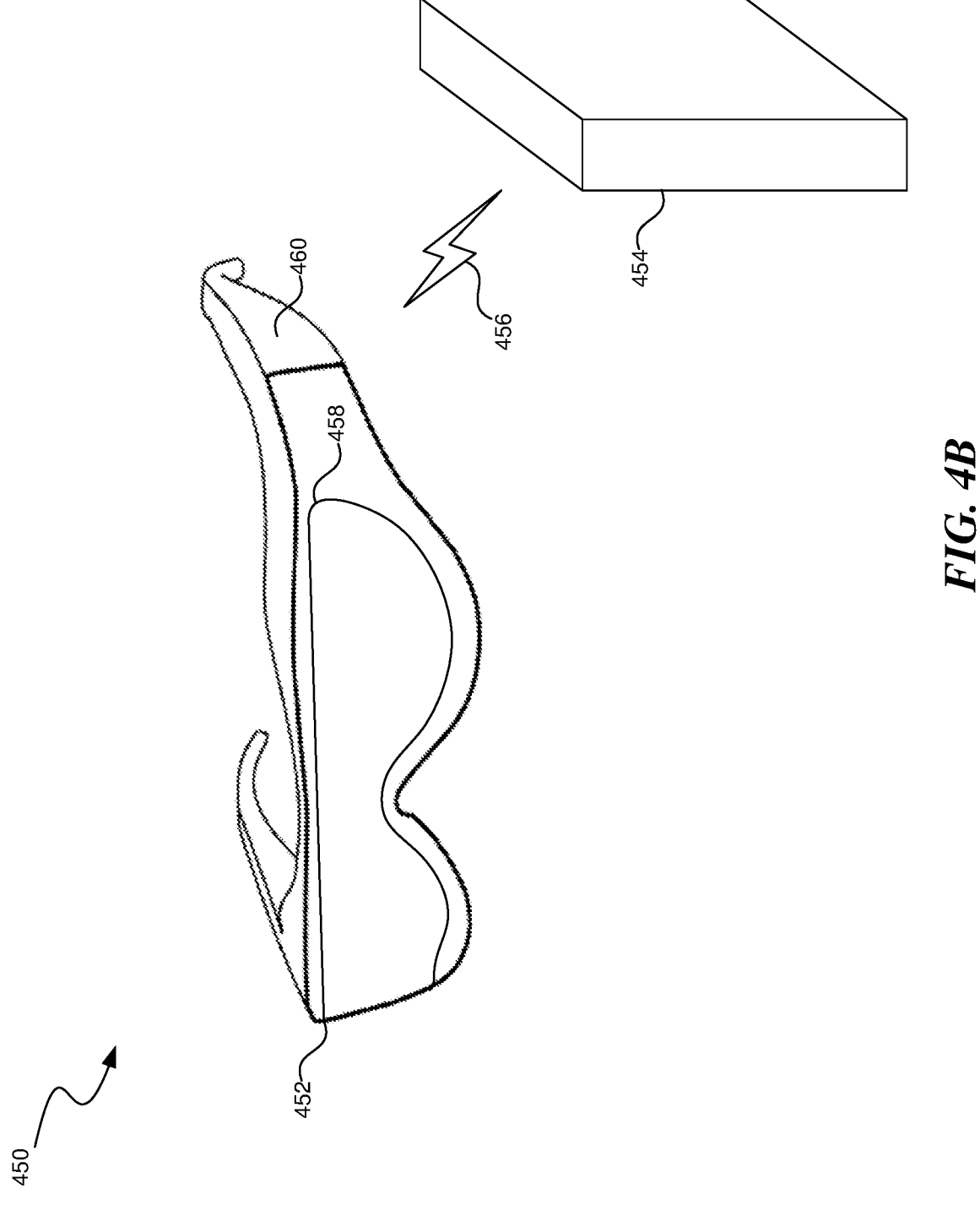
FIG. 4B is a wire diagram illustrating a mixed reality headset which can be used in some implementations of the present technology.

FIG. 4B is a wire diagram of a mixed reality HMD system 450 which includes a mixed reality HMD 452 and a core processing component 454. The mixed reality HMD 452 and the core processing component 454 can communicate via a wireless connection (e.g., a 60 GHz link) as indicated by link 456. In other implementations, the mixed reality system 450 includes a headset only, without an external compute device or includes other wired or wireless connections between the mixed reality HMD 452 and the core processing component 454. The mixed reality HMD 452 includes a pass-through display 458 and a frame 460. The frame 460 can house various electronic components (not shown) such as light projectors (e.g., LASERs, LEDs, etc.), cameras, eye-tracking sensors, MEMS components, networking components, etc.

The projectors can be coupled to the pass-through display 458, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 454 via link 456 to HMD 452. Controllers in the HMD 452 can convert the image data into light pulses from the projectors, which can be transmitted via the optical elements as output light to the user's eye. The output light can mix with light that passes through the display 458, allowing the output light to present virtual objects that appear as if they exist in the real world.

Similarly to the HMD 400, the HMD system 450 can also include motion and position tracking units, cameras, light sources, etc., which allow the HMD system 450 to, e.g., track itself in 3DoF or 6DoF, track portions of the user (e.g., hands, feet, head, or other body parts), map virtual objects to appear as stationary as the HMD 452 moves, and have virtual objects react to gestures and other real-world objects.

Figure 4C:
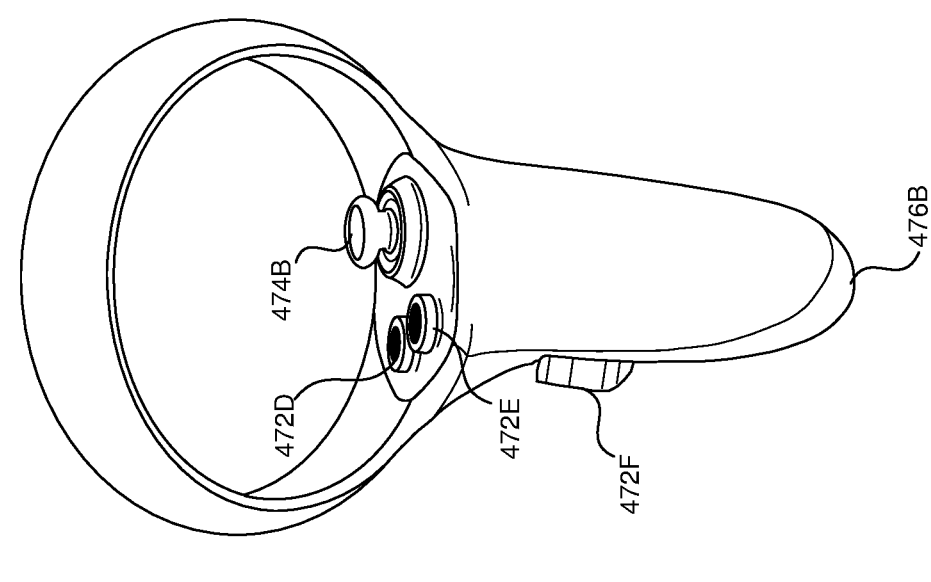
FIG. 4C is a wire diagram illustrating controllers which, in some implementations, a user can hold in one or both hands to interact with an artificial reality environment.
Figure 4C:
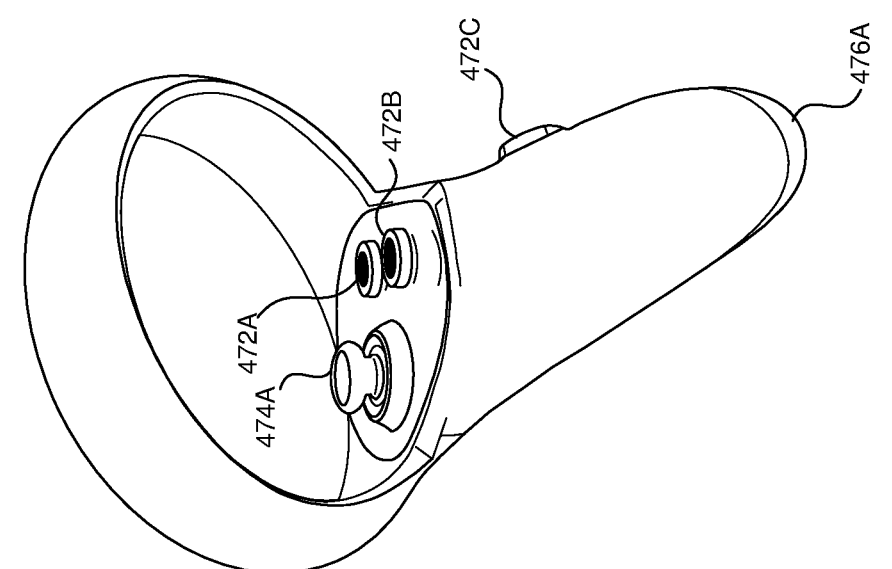
Figure 4C:

FIG. 4C illustrates controllers 470 (including controller 476A and 476B), which, in some implementations, a user can hold in one or both hands to interact with an artificial reality environment presented by the HMD 400 and/or HMD 450. The controllers 470 can be in communication with the HMDs, either directly or via an external device (e.g., core processing component 454). The controllers can have their own IMU units, position sensors, and/or can emit further light points. The HMD 400 or 450, external sensors, or sensors in the controllers can track these controller light points to determine the controller positions and/or orientations (e.g., to track the controllers in 3DoF or 6DoF). The compute units 430 in the HMD 400 or the core processing component 454 can use this tracking, in combination with IMU and position output, to monitor hand positions and motions of the user. The controllers can also include various buttons (e.g., buttons 472A-F) and/or joysticks (e.g., joysticks 474A-B), which a user can actuate to provide input and interact with objects.

In various implementations, the HMD 400 or 450 can also include additional subsystems, such as an eye tracking unit, an audio system, various network components, etc., to monitor indications of user interactions and intentions. For example, in some implementations, instead of or in addition to controllers, one or more cameras included in the HMD 400 or 450, or from external cameras, can monitor the positions and poses of the user's hands to determine gestures and other hand and body motions. As another example, one or more light sources can illuminate either or both of the user's eyes and the HMD 400 or 450 can use eye-facing cameras to capture a reflection of this light to determine eye position (e.g., based on set of reflections around the user's cornea), modeling the user's eye and determining a gaze direction.

Figure 5:
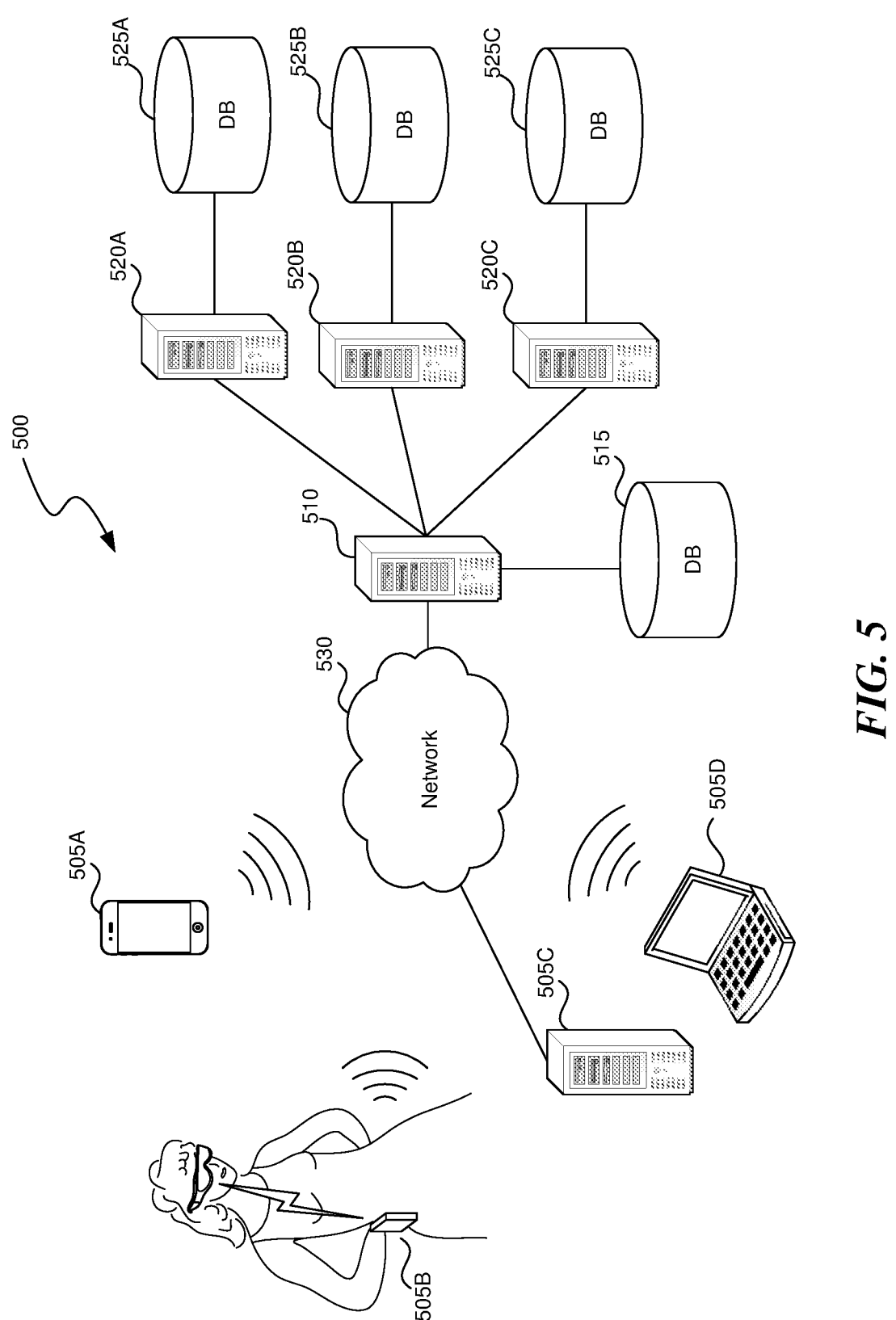
FIG. 5 is a block diagram illustrating an overview of an environment in which some implementations of the present technology can operate.

FIG. 5 is a block diagram illustrating an overview of an environment 500 in which some implementations of the disclosed technology can operate. Environment 500 can include one or more client computing devices 505A-D, examples of which can include computing system 100. In some implementations, some of the client computing devices (e.g., client computing device 505B) can be the HMD 400 or the HMD system 450. Client computing devices 505 can operate in a networked environment using logical connections through network 530 to one or more remote computers, such as a server computing device.

In some implementations, server 510 can be an edge server which receives client requests and coordinates fulfillment of those requests through other servers, such as servers 520A-C. Server computing devices 510 and 520 can comprise computing systems, such as computing system 100. Though each server computing device 510 and 520 is displayed logically as a single server, server computing devices can each be a distributed computing environment encompassing multiple computing devices located at the same or at geographically disparate physical locations.

Client computing devices 505 and server computing devices 510 and 520 can each act as a server or client to other server/client device(s). Server 510 can connect to a database 515. Servers 520A-C can each connect to a corresponding database 525A-C. As discussed above, each server 510 or 520 can correspond to a group of servers, and each of these servers can share a database or can have their own database. Though databases 515 and 525 are displayed logically as single units, databases 515 and 525 can each be a distributed computing environment encompassing multiple computing devices, can be located within their corresponding server, or can be located at the same or at geographically disparate physical locations.

Network 530 can be a local area network (LAN), a wide area network (WAN), a mesh network, a hybrid network, or other wired or wireless networks. Network 530 may be the Internet or some other public or private network. Client computing devices 505 can be connected to network 530 through a network interface, such as by wired or wireless communication. While the connections between server 510 and servers 520 are shown as separate connections, these connections can be any kind of local, wide area, wired, or wireless network, including network 530 or a separate public or private network.

Figure 6:
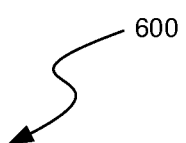
FIG. 6 is a block diagram illustrating components which, in some implementations, can be used in a system employing the disclosed technology.
Figure 6:
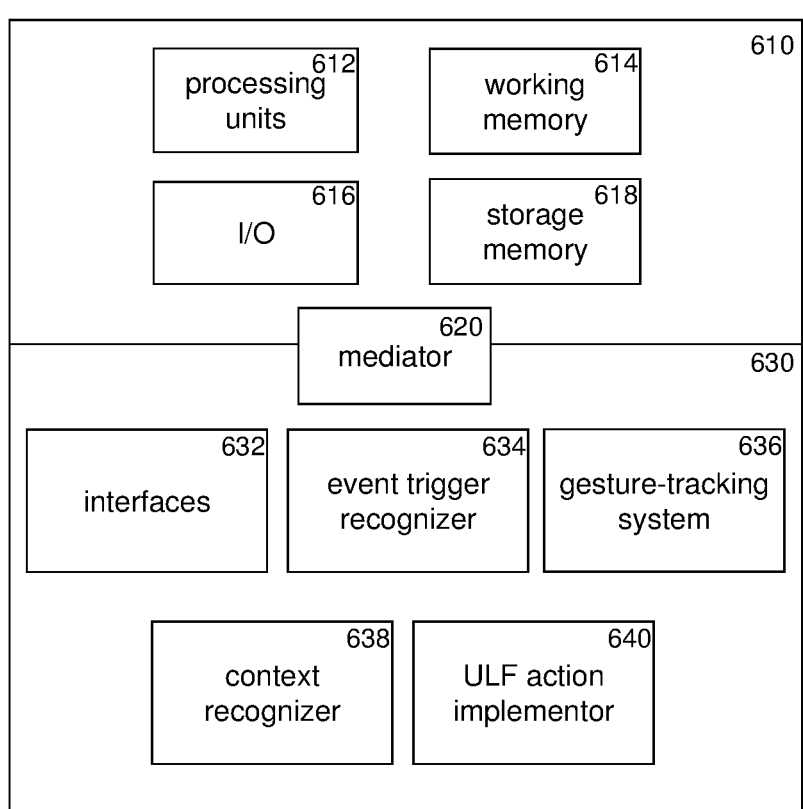

FIG. 6 is a block diagram illustrating components 600 which, in some implementations, can be used in a system employing the disclosed technology. Components 600 can be included in one device of computing system 100 or can be distributed across multiple of the devices of computing system 100. The components 600 include hardware 610, mediator 620, and specialized components 630. As discussed above, a system implementing the disclosed technology can use various hardware including processing units 612, working memory 614, input and output devices 616 (e.g., cameras, displays, IMU units, network connections, etc.), and storage memory 618. In various implementations, storage memory 618 can be one or more of: local devices, interfaces to remote storage devices, or combinations thereof. For example, storage memory 618 can be one or more hard drives or flash drives accessible through a system bus or can be a cloud storage provider (such as in storage database 515 or 525) or other network storage accessible via one or more communications networks. In various implementations, components 600 can be implemented in a client computing device such as client computing devices 505 or on a server computing device, such as server computing device 510 or 520.

Mediator 620 can include components which mediate resources between hardware 610 and specialized components 630. For example, mediator 620 can include an operating system, services, drivers, a basic input output system (BIOS), controller circuits, or other hardware or software systems.

Specialized components 630 can include software or hardware configured to perform operations for providing "ultra low friction" (ULF) gestures. Specialized components 630 can include event trigger recognizer 634, gesture-tracking system 636, context recognizer 638, ULF action implementor 640, and components and APIs which can be used for providing user interfaces, transferring data, and controlling the specialized components, such as interfaces 632. In some implementations, components 600 can be in a computing system that is distributed across multiple computing devices or can be an interface to a server-based application executing one or more of specialized components 630. Although depicted as separate components, specialized components 630 may be logical or other nonphysical differentiations of functions and/or may be submodules or code-blocks of one or more applications.

Event trigger recognizer 634 can receive data about the artificial reality environment, internal artificial reality device state, network messages, or other data mapped to an ULF gesture and can provide a signal for the gesture-tracking system 636 to identify whether a corresponding pinch gesture was made. Additional details on recognizing event triggers are provided above with regard to block 202 of FIG. 2.

Gesture-tracking system 636 can take image, IMU, EMG, or other sensor data and determine a corresponding pose (and in some cases position) of one or both of the user's hands. In some implementations, a gesture can comprise a motion, such as moving a thumb, and the gesture-tracking system 636 can determine the user's hand pose as it changes over time to determine if a pre-defined gesture has been performed. Additional details on gesture recognition are provided above with regard to blocks 206 and 210 of FIG. 2.

Context recognizer 638 can identify a context that exists when a user makes a pinch gesture. In some implementations, the mapping of a gesture to an action can be based on a context that was recognized when the pinch was made. For example, the mapping can define, for each gesture type, at a first level an event trigger, and below that a set of contexts, where the system identifies in the mapping, for the gesture made by the user, the action that also matches both the event trigger and the context determined for when the pinch gesture was made (or when event trigger was received or when the subsequent tug, snap, or thumb-swipe gesture was made). For example, different actions can be mapped to the snap gesture, for the message received event trigger, depending on contexts. Contexts can be any discernible state such as where the user is looking, what actions the user is taking (e.g., sitting, walking, driving, watching TV, etc.), who else has been identified to be in the vicinity, what the user is doing (e.g., other gestures) with her other hand, a history or relationship between the current user and a user related to the event trigger (e.g., a sender of the message), a determined user physical or emotional state (e.g., pulse, eye movement, temperature, happy, sad, excited, bored, etc.), time of day, date, weather conditions, where the artificial reality device is geographically, an identified type of event occurring around the artificial reality device, recent actions taken by the current user, etc. These contexts can be determined in various ways such as through images, movement data, and/or audio taken of the surrounding area or of the user and provided to one or more machine learning models trained to identify these types of contexts (e.g., object recognizers, action recognizers, people recognizers, emotion identifiers, etc.), from network data supplied from external sources that specify the current context (e.g., time, date, weather condition), from wireless communications with other devices in the area, from internal sensors (e.g., GPS systems, inertial motion unit (IMU) systems, heat sensors, depth sensors, etc.), etc.

ULF action implementor 640 can take the action determined to be mapped to the event trigger, pinch, and subsequent gesture (and in some cases context). Additional details on taking actions for ULF gestures are provided above with regard to blocks 214, 216, and 218 of FIG. 2.

Those skilled in the art will appreciate that the components illustrated in FIGS. 3 through 6 described above, and portions of the flow diagram, may be altered in a variety of ways. For example, the order of the logic may be rearranged, substeps may be performed in parallel, illustrated logic may be omitted, other logic may be included, etc. In some implementations, one or more of the components described above can execute one or more of the processes also described above.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for an artificial reality system to respond to gestural input, the method comprising:

identifying an event trigger comprising identifying an indication of a received message;

receiving, from a gesture-tracking system, a pinch gesture in relation to the event trigger, wherein the pinch gesture is received in response to the gesture-tracking system detecting that a tip of a thumb of a user and a tip of one other finger of the user touching each other;

determining a first action, of multiple actions associated with the pinch gesture, based on a mapping of A) a context determined when the pinch gesture was made to B) the first action of the multiple actions associated with the pinch gesture, wherein the context includes one or more of a discernable state of the user, surroundings of the user, and one or more recent actions of the user relative to when the pinch gesture was made;

in response to the pinch gesture, taking the first action mapped to the pinch gesture in the context, the first action comprising recording a response to the received message;

receiving, from the gesture-tracking system, a thumb-swipe or a snap gesture, wherein the thumb-swipe or the snap gesture is received in response to the gesture-tracking system detecting either A) that the user has moved, above a threshold speed, the tip of the thumb away and to the side from the tip of the one other finger or B) that the user has moved the tip of the thumb away from the tip of the one other finger and along a side of the one other finger; and in response to the thumb-swipe or snap gesture, taking a second action mapped to the thumb-swipe or snap gesture, wherein the second action comprises stopping recording and sending the response to the received message.

2. The method of claim 1, wherein the pinch gesture is in relation to the event trigger by the pinch gesture being directed at a UI display provided in response to the event trigger showing an indication of the received message.

3. The method of claim 1, wherein;

a third action is mapped to a pinch release gesture, wherein the third action comprises opening a message editing dialog; and the method further comprises:

receiving, from the gesture-tracking system, the pinch release gesture.

4. The method of claim 1, wherein;

a third action is mapped a tug left gesture, wherein the third action comprises discarding the response unsent; and the method further comprises:

receiving, from the gesture-tracking system, the tug left gesture.

5. The method of claim 1, wherein the second action of stopping recording and sending the response to the received message is mapped to the thumb-swipe or snap gesture due to a previous determination that stopping recording and sending the response is the action most commonly taken following a pinch gesture in relation to receiving a message.

6. A computer-readable storage medium storing instructions that, when executed by a computing system, cause the computing system to perform a process for an artificial reality system to respond to gestural input, the process comprising:

receiving, from a gesture-tracking system, a pinch gesture in relation to an event trigger, wherein the pinch gesture is received in response to the gesture-tracking system detecting a tip of a thumb of a user and a tip of one other finger of the user touching each other;

determining a first action, of multiple actions associated with the pinch gesture, based on a mapping of A) a context determined when the pinch gesture was made to B) the first action of the multiple actions associated with the pinch gesture, wherein the context includes one or more of a discernable state of the user, surroundings of the user, and one or more recent actions of the user relative to when the pinch gesture was made;

in response to the pinch gesture, taking the first action mapped to the pinch gesture in the context;

receiving, from the gesture-tracking system, a thumb-swipe or snap gesture, wherein the thumb-swipe or the snap gesture is received in response to the gesture-tracking system detecting either A) that the user has moved, above a threshold speed, the tip of the thumb away and to the side from the tip of the one other finger or B) that the user has moved the tip of the thumb away from the tip of the one other finger and along a side of the one other finger; and in response to the thumb-swipe or snap gesture, taking a second action mapped to the thumb-swipe or snap gesture.

7. The computer-readable storage medium of claim 6, wherein:

the event trigger is an indication of a received message, the first action mapped to the pinch gesture is recording a response to the received message, and the second action mapped to the thumb-swipe or snap gesture is stopping recording and sending the response to the received message.

8. The computer-readable storage medium of claim 6, wherein the second action comprises sending a recorded message.

9. The computer-readable storage medium of claim 6, wherein the second action is mapped to the thumb-swipe or snap gesture due to a previous determination that the second action is the action most commonly taken, by the user, following a pinch gesture in relation to the event trigger.

10. The computer-readable storage medium of claim 6, wherein the context comprises one or more of:

a determination of where the user is looking;

a determination of what actions the user is taking;

a determination of who has been identified to be in the surroundings of the user; and a history or relationship between the user and a second user related to the event trigger.

11. The computer-readable storage medium of claim 6, wherein:

a third action is mapped to a tug gesture, wherein the third action comprises causing a delete, discard, or cancel action for a result of the first action; and the instructions, when executed by the computing system, further cause the computing system to perform:

receiving, from the gesture-tracking system, the tug gesture.

12. The computer-readable storage medium of claim 6, wherein:

a third action is mapped to a tug gesture, wherein the third action is associated with a second most common action following the first action; and the instructions, when executed by the computing system, further cause the computing system to perform:

receiving, from the gesture-tracking system, the tug gesture.

13. The computer-readable storage medium of claim 6, wherein:

a third action is mapped to a pinch release gesture, wherein the third action comprises causing activation of an editing mode for a result of the first action; and the instructions, when executed by the computing system, further cause the computing system to perform:

receiving, from the gesture-tracking system, the pinch release gesture.

14. The computer-readable storage medium of claim 6, wherein:

the event trigger is an indication of a calendar event alert, the first action mapped to the pinch gesture is to bring up a map for a location in relation to the calendar event, and the second action mapped to the thumb-swipe or snap gesture is to start navigation to the location.

15. The computer-readable storage medium of claim 6, wherein:

the event trigger is an indication of another person in an artificial reality environment provided by the artificial reality system;

the first action mapped to the pinch gesture is bringing up a UI related to the other person, and the second action mapped to the thumb-swipe or snap gesture is initiating a messaging interface with that other person.

16. An artificial reality computing system for responding to gestural input, the artificial reality computing system comprising:

one or more processors; and one or more memories storing instructions that, when executed by the one or more processors, cause the computing system to perform a process comprising:

receiving, from a gesture-tracking system, a pinch gesture in relation to an event trigger, wherein the pinch gesture is received in response to the gesture-tracking system detecting a tip of a thumb of a user and a tip of one other finger of the user touching each other;

determining a first action, of multiple actions associated with the pinch gesture, based on a mapping of A) a context determined when the pinch gesture was made to B) the first action of the multiple actions associated with the pinch gesture, wherein the context includes one or more of a discernable state of the user, surroundings of the user, and one or more recent actions of the user relative to when the pinch gesture was made;

in response to the pinch gesture, taking the first action mapped to the pinch gesture in the context;

receiving, from the gesture-tracking system, a thumb-swipe or snap gesture, wherein the thumb-swipe or the snap gesture is received in response to the gesture-tracking system detecting either A) that the user has moved, above a threshold speed, the tip of the thumb away and to the side from the tip of the one other finger or B) that the user has moved the tip of the thumb away from the tip of the one other finger and along a side of the one other finger; and in response to the thumb-swipe or snap gesture, taking a second action mapped to the thumb-swipe or snap gesture.

17. The artificial reality computing system of claim 16, wherein:

the event trigger is an indication of a received message, the first action mapped to the pinch gesture is recording a response to the received message, and the second action mapped to the thumb-swipe or snap gesture is stopping recording and sending the response to the received message.

18. The artificial reality computing system of claim 16, wherein the second action is mapped to the thumb-swipe or snap gesture due to a previous determination that the second action is the action most commonly taken, by multiple users, following a pinch gesture in relation to the event trigger.

19. The artificial reality computing system of claim 16, wherein:

the event trigger is an indication of a calendar event alert, the first action mapped to the pinch gesture is to bring up a map for a location in relation to the calendar event, and the second action mapped to the thumb-swipe or snap gesture is to start navigation to the location.

20. The artificial reality computing system of claim 16, wherein:

the event trigger is an indication of another person in an artificial reality environment provided by the computing system;

the first action mapped to the pinch gesture is bringing up a UI related to the other person, and the second action mapped to the thumb-swipe or snap gesture is initiating a messaging interface with that other person.

* * * * *